(12) United States Patent
Sugita et al.

(10) Patent No.: US 10,620,401 B2
(45) Date of Patent: Apr. 14, 2020

(54) OPTICAL SYSTEM AND IMAGE PICKUP APPARATUS HAVING THE SAME

(71) Applicant: CANON KABUSHIKI KAISHA, Tokyo (JP)

(72) Inventors: Shigenobu Sugita, Shimotsuke (JP); Yuichi Gyoda, Utsunomiya (JP); Suguru Inoue, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 6 days.

(21) Appl. No.: 15/606,843

(22) Filed: May 26, 2017

(65) Prior Publication Data
US 2017/0351060 A1    Dec. 7, 2017

(30) Foreign Application Priority Data
Jun. 1, 2016  (JP) .................. 2016-109658

(51) Int. Cl.
| | |
|---|---|
| *G02B 9/26* | (2006.01) |
| *G02B 9/12* | (2006.01) |
| *G02B 13/02* | (2006.01) |
| *G02B 13/18* | (2006.01) |
| *G02B 27/00* | (2006.01) |
| *G02B 15/16* | (2006.01) |

(52) U.S. Cl.
CPC .............. *G02B 9/26* (2013.01); *G02B 9/12* (2013.01); *G02B 13/02* (2013.01); *G02B 13/18* (2013.01); *G02B 15/16* (2013.01); *G02B 27/0025* (2013.01)

(58) Field of Classification Search
CPC ... G02B 9/26; G02B 9/12; G02B 9/14; G02B 9/24; G02B 13/02; G02B 13/18; G02B 15/16; G02B 27/0025

USPC .......................................... 359/745–748, 689
See application file for complete search history.

(56) References Cited

U.S. PATENT DOCUMENTS

| | | |
|---|---|---|
| 6,115,188 A | 9/2000 | Nishio et al. |
| 7,609,446 B2 | 10/2009 | Nanba |
| 7,626,771 B2 | 12/2009 | Yokoyama |
| 7,894,135 B2 | 2/2011 | Nanba |
| 7,948,691 B2 | 5/2011 | Okumura |
| 8,223,436 B2 | 7/2012 | Sugita |
| 8,314,996 B2 | 11/2012 | Nanba |
| 8,331,034 B2 | 12/2012 | Kimura |
| 8,503,095 B2 | 8/2013 | Kimura |
| 8,681,433 B2 | 3/2014 | Ono |
| 8,705,180 B2 | 4/2014 | Takano et al. |
| 9,081,170 B2 | 7/2015 | Kimura |

(Continued)

FOREIGN PATENT DOCUMENTS

| | | |
|---|---|---|
| JP | 2014-026023 A | 2/2014 |
| JP | 2014-56195 A | 3/2014 |

(Continued)

*Primary Examiner* — Marin Pichler
(74) *Attorney, Agent, or Firm* — Canon U.S.A., Inc. IP Division

(57) ABSTRACT

An optical system includes a plurality of lenses. The distance from the object side lens surface of a lens arranged an the most object side to the image plane is longer than the focal length of the entire system. The material of a positive lens G1p arranged on the most object side among positive lenses included in the optical system, and the arrangement and material of a negative lens Gn located on the most object side among negative lenses arranged an the image side of the positive lens G1p are appropriately set.

14 Claims, 15 Drawing Sheets

(56) References Cited

U.S. PATENT DOCUMENTS

| | | |
|---|---|---|
| 9,134,512 B2 | 9/2015 | Iwamoto |
| 9,678,318 B2 | 6/2017 | Nakamura et al. |
| 9,946,065 B2 | 4/2018 | Okumura |
| 9,983,392 B2 | 5/2018 | Inoue |
| 10,107,992 B2 * | 10/2018 | Ogata .................... G02B 13/02 |
| 2006/0209426 A1 * | 9/2006 | Suzuki .................... G02B 9/30 |
| | | 359/689 |
| 2011/0080654 A1 | 4/2011 | Okumura |
| 2011/0310486 A1 * | 12/2011 | Eguchi ................... G02B 13/18 |
| | | 359/570 |
| 2013/0194487 A1 | 8/2013 | Eguchi |
| 2015/0109519 A1 | 4/2015 | Fujikura et al. |
| 2016/0109690 A1 | 4/2016 | Ogata et al. |
| 2017/0129801 A1 * | 5/2017 | Kikkawa ................. C03C 3/097 |
| 2017/0351060 A1 | 12/2017 | Sugita et al. |
| 2017/0351089 A1 | 12/2017 | Gyoda et al. |

FOREIGN PATENT DOCUMENTS

| | | |
|---|---|---|
| JP | 2015-108814 A | 6/2015 |
| JP | 2015-111254 A | 6/2015 |
| JP | 2015-215560 A | 12/2015 |
| JP | 2015-215561 A | 12/2015 |
| JP | 2016-051100 A | 4/2016 |
| JP | 2016-148707 A | 8/2016 |
| JP | 2016-161644 A | 9/2016 |

* cited by examiner

OPTICAL SYSTEM AND IMAGE PICKUP APPARATUS HAVING THE SAME

BACKGROUND

Field of Art

The present disclosure relates to an optical system and an image pickup apparatus having the same, and is suitable for an image pickup apparatus employing an image pickup element, such as a digital still camera, a video camera, a monitoring camera, a broadcast camera, or an image pickup apparatus such as a camera using silver-halide photography film.

Description of the Related Art

A shooting optical system of a so-called telephoto-type in which an optical system having positive refractive power is arranged on the object side, and an optical system having negative refractive power is arranged on the image side is known as a shooting optical system having a long focal length. A shooting optical system of a telephoto-type is used, for example, in an ultra-telephoto lens having a fixed focal length.

In general, in an ultra-telephoto lens, primary chromatic aberration and secondary spectrum (chromatic aberration for the g-line) increase with increase in focal length. Appropriately setting the balance between the amount of occurrence of chromatic aberration of a positive lens and the amount of correction of chromatic aberration by a negative lens is known as a method for reducing primary chromatic aberration. Using a lens formed of a material having anomalous dispersion is known as a method for reducing the secondary spectrum.

In a shooting optical system of Japanese Patent Laid-Open No. 2015-215560, the secondary spectrum is reduced by arranging a positive lens formed of a material having anomalous dispersion on the most object side.

In general, when a positive lens arranged in a lens unit having positive refractive power as a whole is formed of a high dispersion material, primary chromatic aberration occurs. A material used for a positive lens and having anomalous dispersion tends to have low dispersion. Therefore, in the optical system of Japanese Patent Laid-Open No. 2015-215560, the amount of primary chromatic aberration occurring in the positive lens arranged on the most object side is small.

In an optical system having positive refractive power as a whole, primary chromatic aberration is generally corrected by arranging a negative lens formed of a high dispersion material. However, when the amount of correction of primary chromatic aberration by a negative lens is too large, primary chromatic aberration is overcorrected, and it is difficult to reduce primary chromatic aberration.

So, in the optical system of Japanese Patent Laid-Open No. 2015-215560, the amount of occurrence and the amount of correction of chromatic aberration in the entire optical system are balanced by arranging a positive lens at a position relatively near to the positive lens arranged on the most object side. Because the positive and negative lenses arranged on the object side have large effective diameters and are likely to be heavy, it is difficult to sufficiently reduce the weight of the optical system of Japanese Patent Laid-Open No. 2015-215560.

SUMMARY

The present disclosure provides an optical system that is lightweight and in which aberrations such as chromatic aberration are satisfactorily corrected, and an image pickup apparatus having the same.

In an aspect of the present embodiment, an optical system includes a positive lens G1$p$, and a negative lens Gn located on the most object side among negative lenses arranged on the image side of the positive lens G1$p$. The positive lens G1$p$ is a positive lens located on the most object side among positive lenses included in the optical system. The following conditional expressions are satisfied:

$$LD/f<1.00,$$

$$0.25<Dpn/LD<0.50,$$

$$1.45<Nd1p<1.68, \text{ and}$$

$$30.0<vd1p<50.0,$$

where Nd1p and vd1p are respectively the refractive index and the Abbe number of the material of the positive lens G1$p$, Dpn is the distance on the optical axis between the positive lens G1$p$ and the negative lens Gn, LD is the distance on the optical axis from the most object side lens surface of the optical system to an image plane, and f is the focal length of the optical system.

Further features will become apparent from the following description of exemplary embodiments with reference to the attached drawings.

DESCRIPTION OF THE EMBODIMENTS

An optical system and an image pickup apparatus having the same will be described below in detail with reference to the drawings. The optical system of the present embodiment includes a plurality of lenses. In the following description, a positive lens arranged on the most object side among positive lenses included in an optical system is denoted as a positive lens G1p, and a negative lens located an the most object side among negative lenses arranged on the image side of the positive lens G1p is denoted as a negative lens Gn. A positive lens arranged on the most object side among positive lenses arranged on the image side of the positive lens G1p is denoted as a positive lens G1p.

Figure 1:
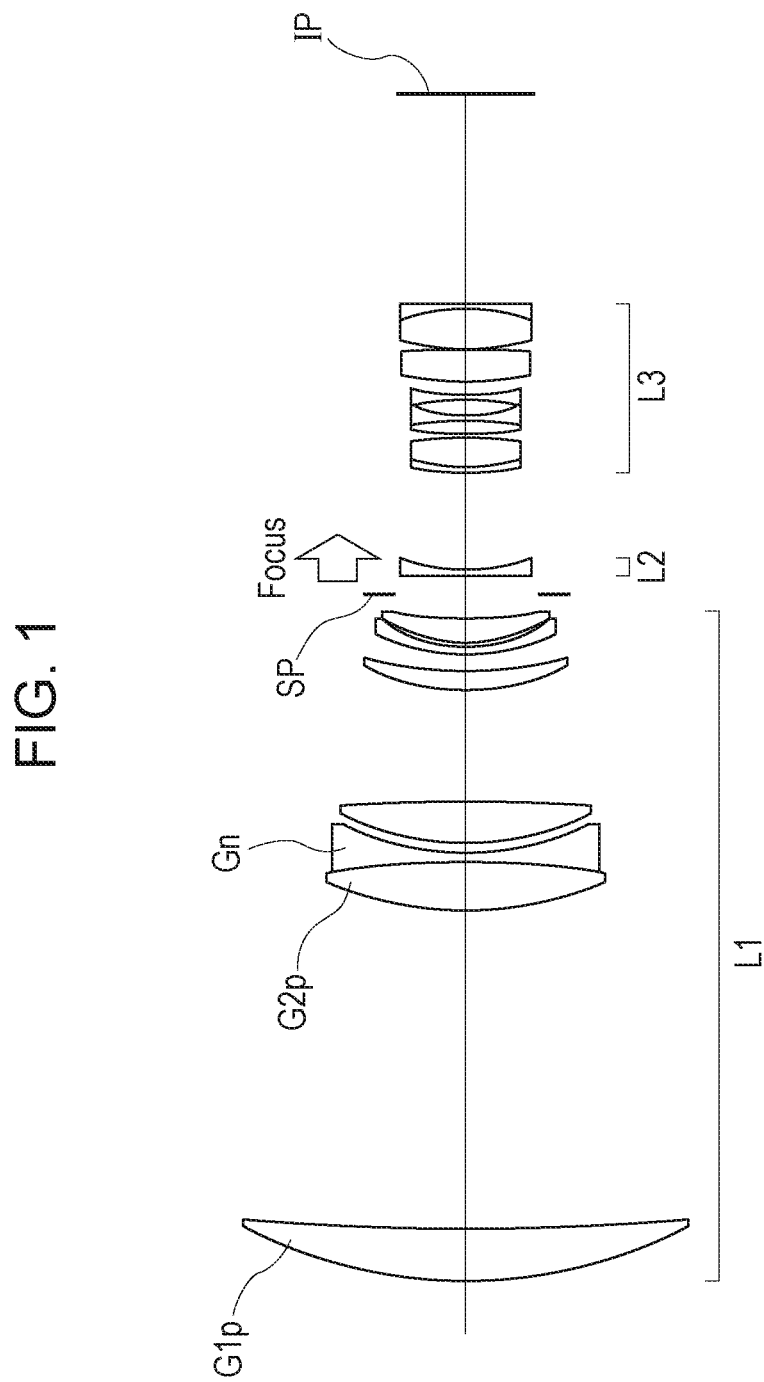
FIG. 1 is a lens sectional view of an optical system of Embodiment 1.
Figure 2:
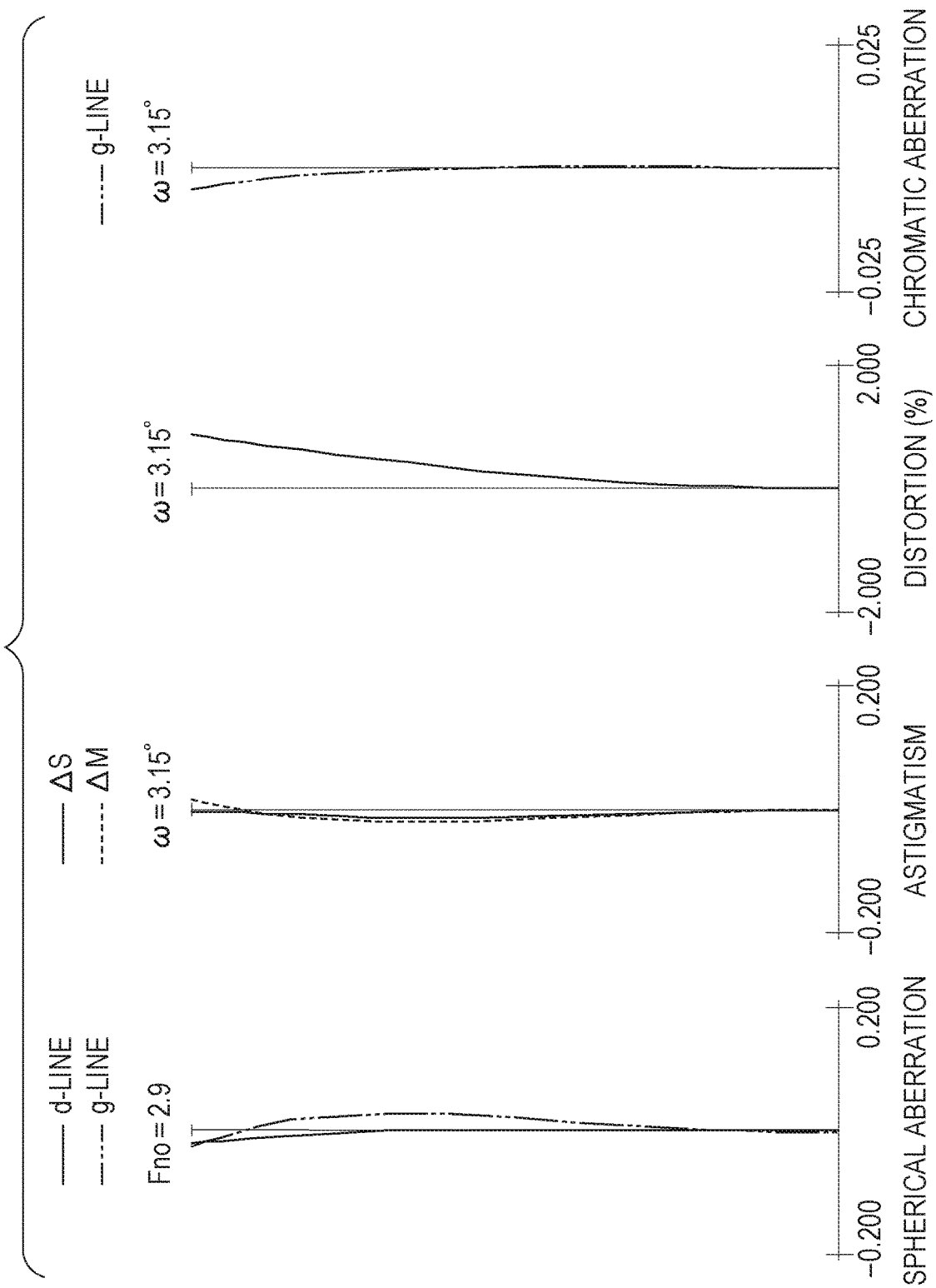
FIG. 2 is an aberration diagram of Embodiment 1 that is in focus at infinity.
Figure 3:
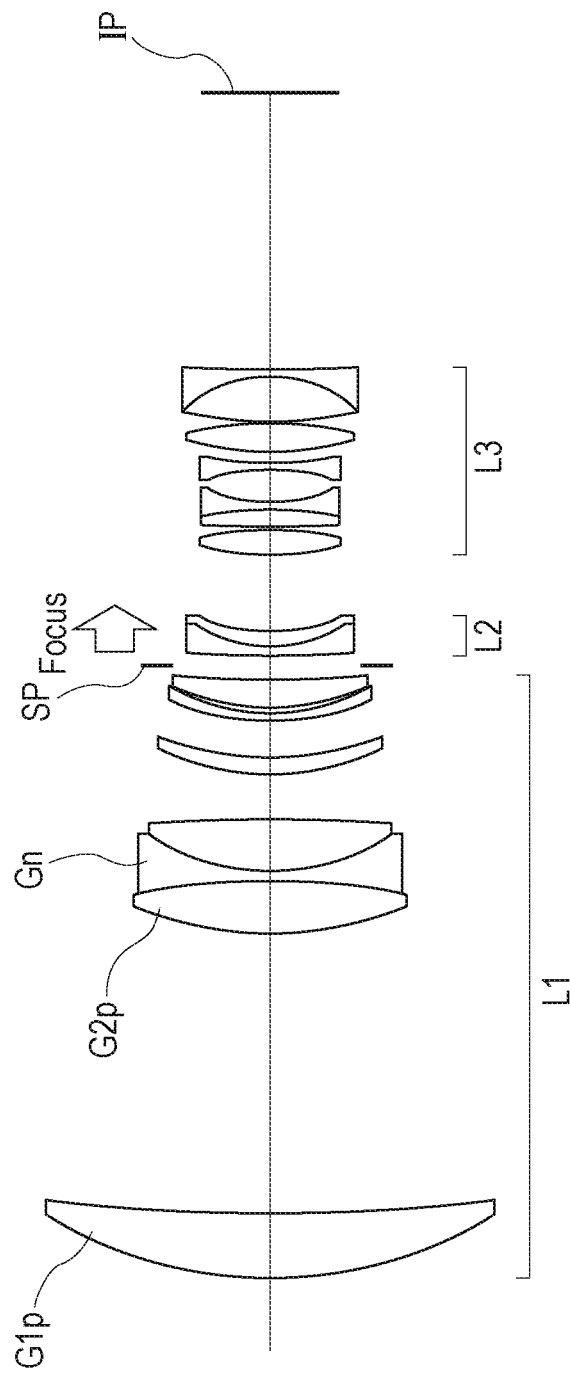
FIG. 3 is a lens sectional view of an optical system of Embodiment 2.
Figure 4:
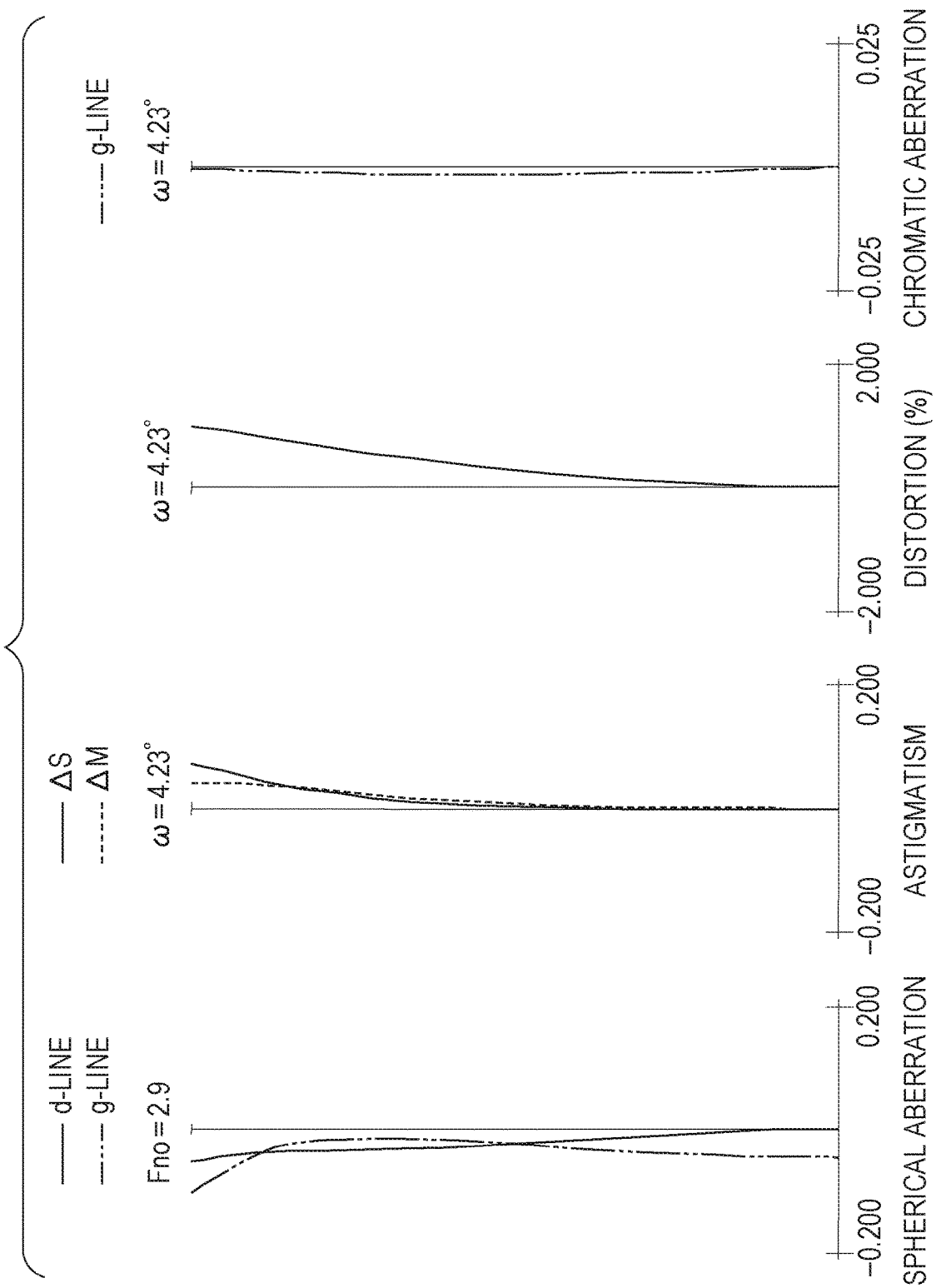
FIG. 4 is an aberration diagram of Embodiment 2 that is in focus at infinity.
Figure 5:
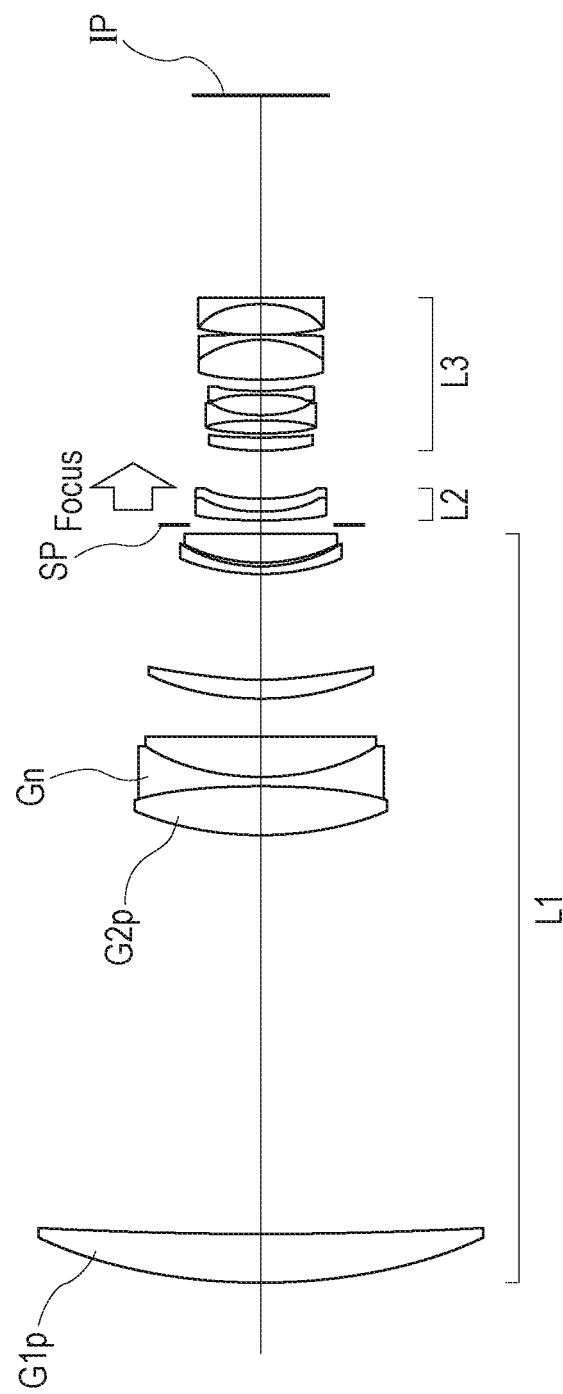
FIG. 5 is a lens sectional view of an optical system of Embodiment 3.
Figure 6:
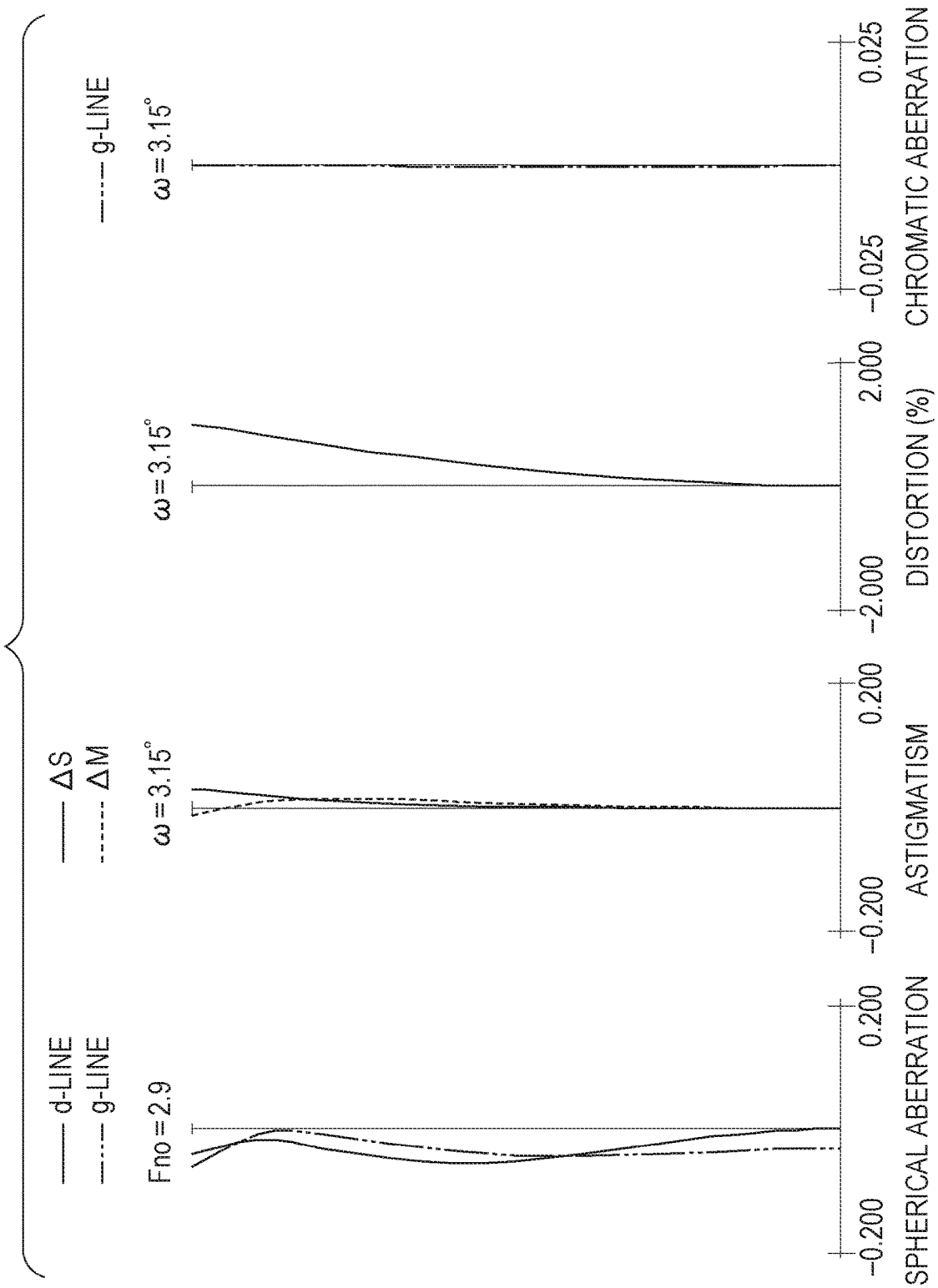
FIG. 6 is an aberration diagram of Embodiment 3 that is in focus at infinity.
Figure 7:
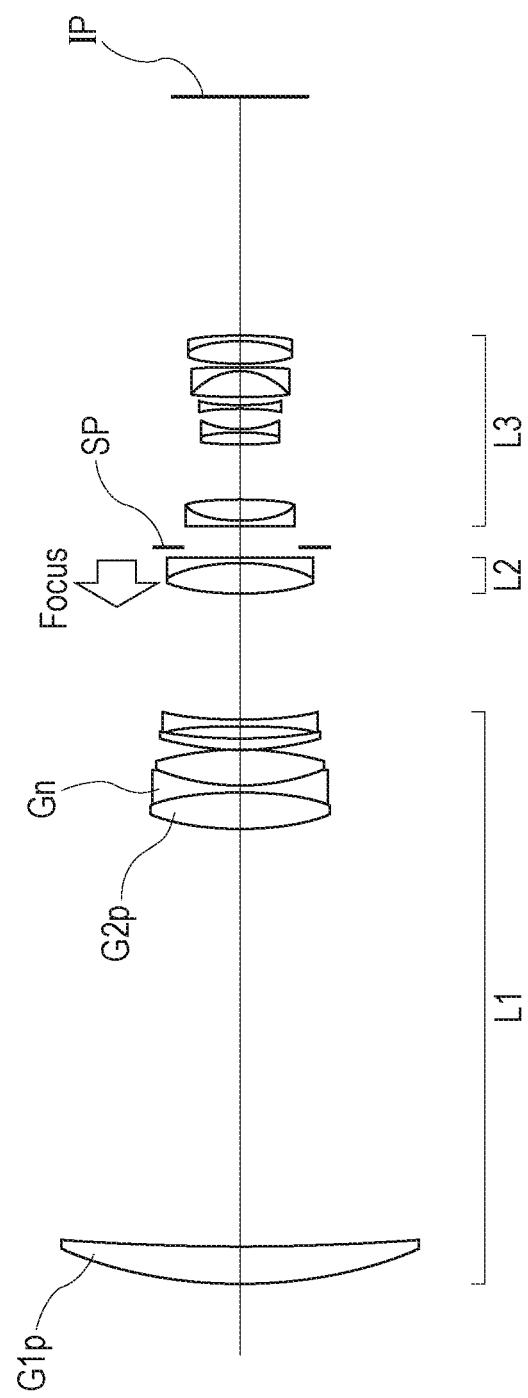
FIG. 7 is a lens sectional view of an optical system of Embodiment 4.
Figure 8:
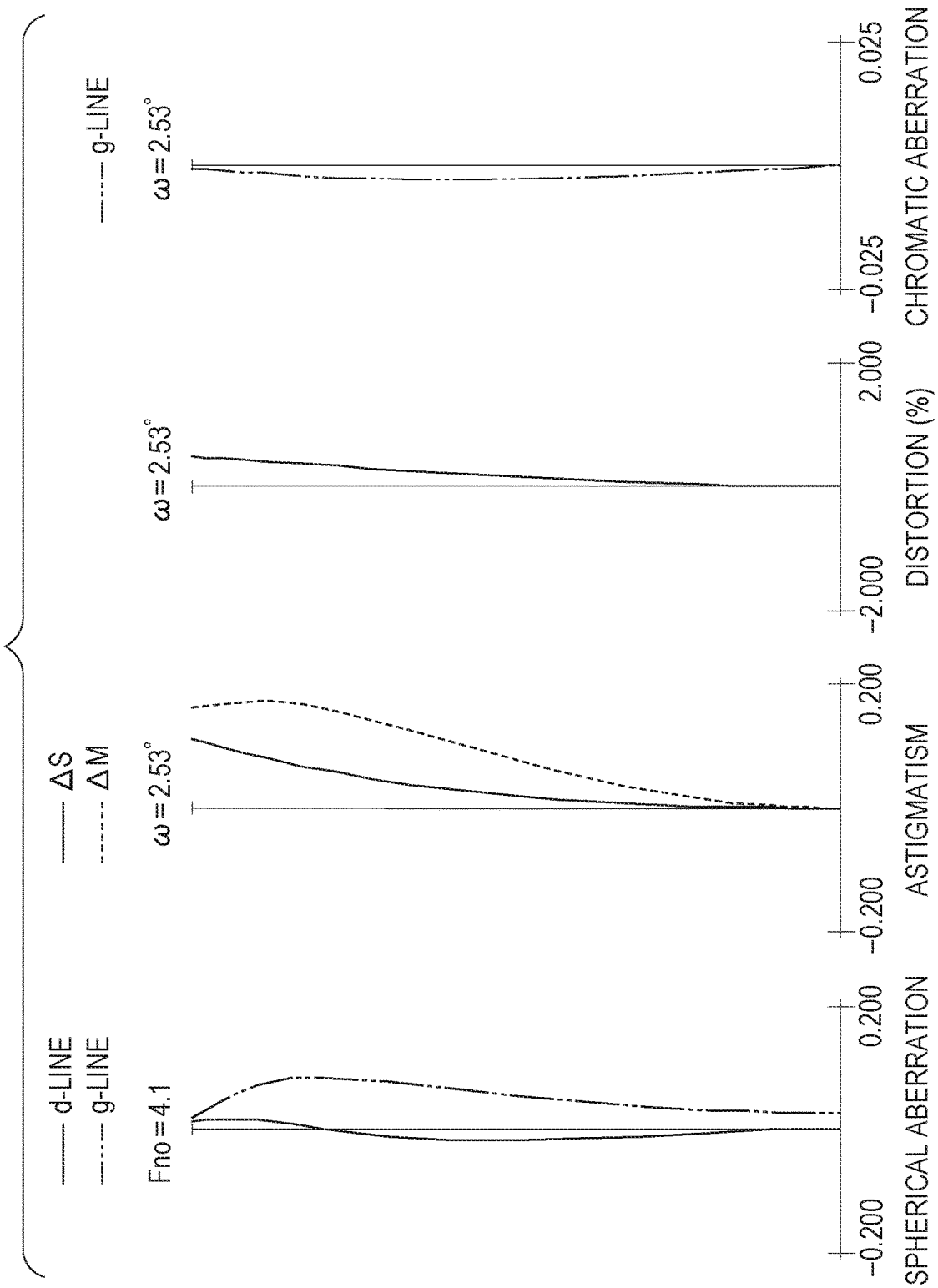
FIG. 8 is an aberration diagram of Embodiment 4 that is in focus at infinity.

FIG. 1 is a lens sectional view of an optical system of Embodiment 1. FIG. 2 is an aberration diagram of Embodiment 1 that is in focus at infinity. FIG. 3 is a lens sectional view of an optical system of Embodiment 2. FIG. 4 is an aberration diagram of Embodiment 2 that is in focus at infinity. FIG. 5 is a lens sectional view of an optical system of Embodiment 3. FIG. 6 is an aberration diagram of Embodiment 3 that is in focus at infinity. FIG. 7 is a lens sectional view f an optical system of Embodiment 4. FIG. 8 is an aberration diagram of Embodiment 4 that is in focus at infinity.

Figure 9:
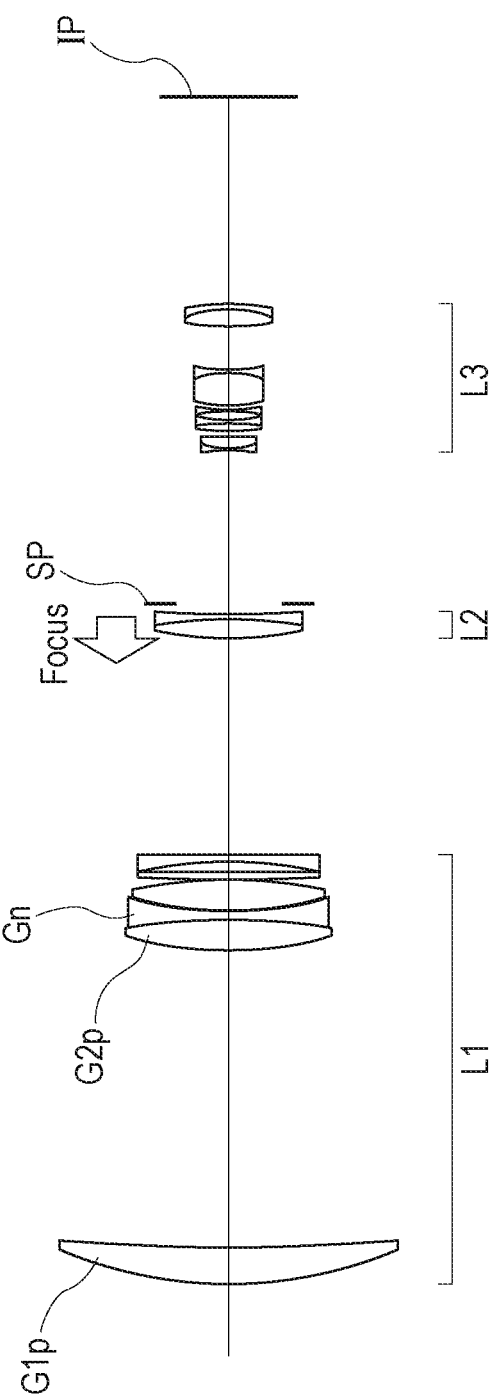
FIG. 9 is a lens sectional view of an optical system of Embodiment 5.
Figure 10:
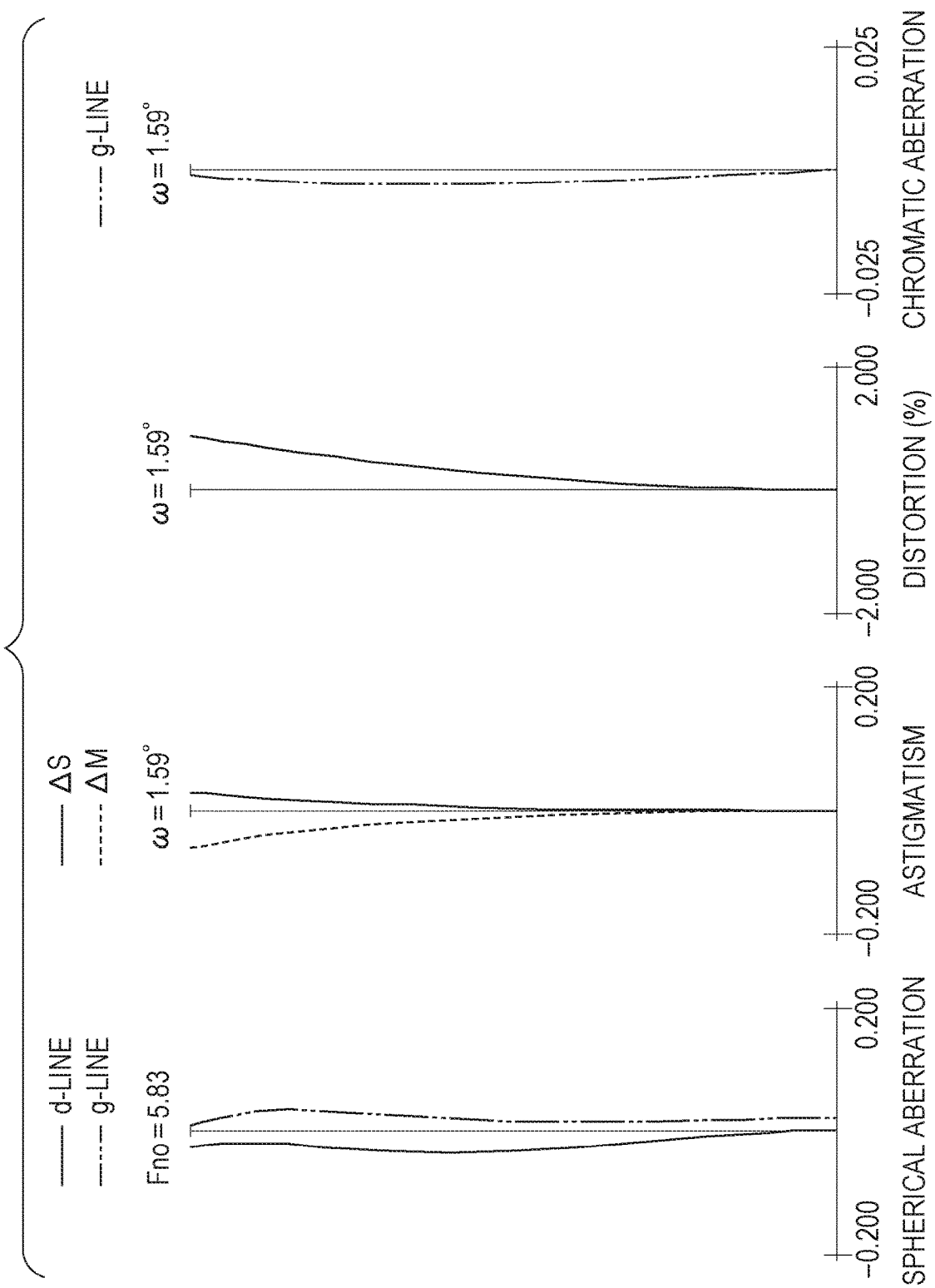
FIG. 10 is an aberration diagram of Embodiment 5 that is in focus at infinity.
Figure 11:
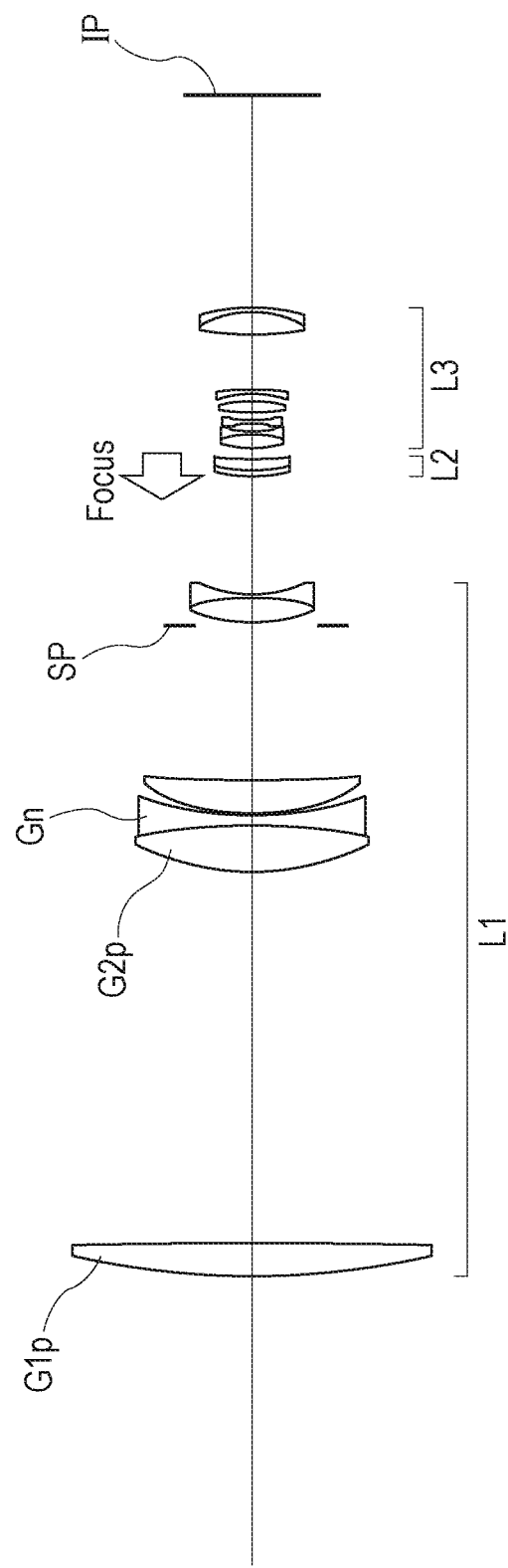
FIG. 11 is a lens sectional view of an optical system of Embodiment 6.
Figure 12:
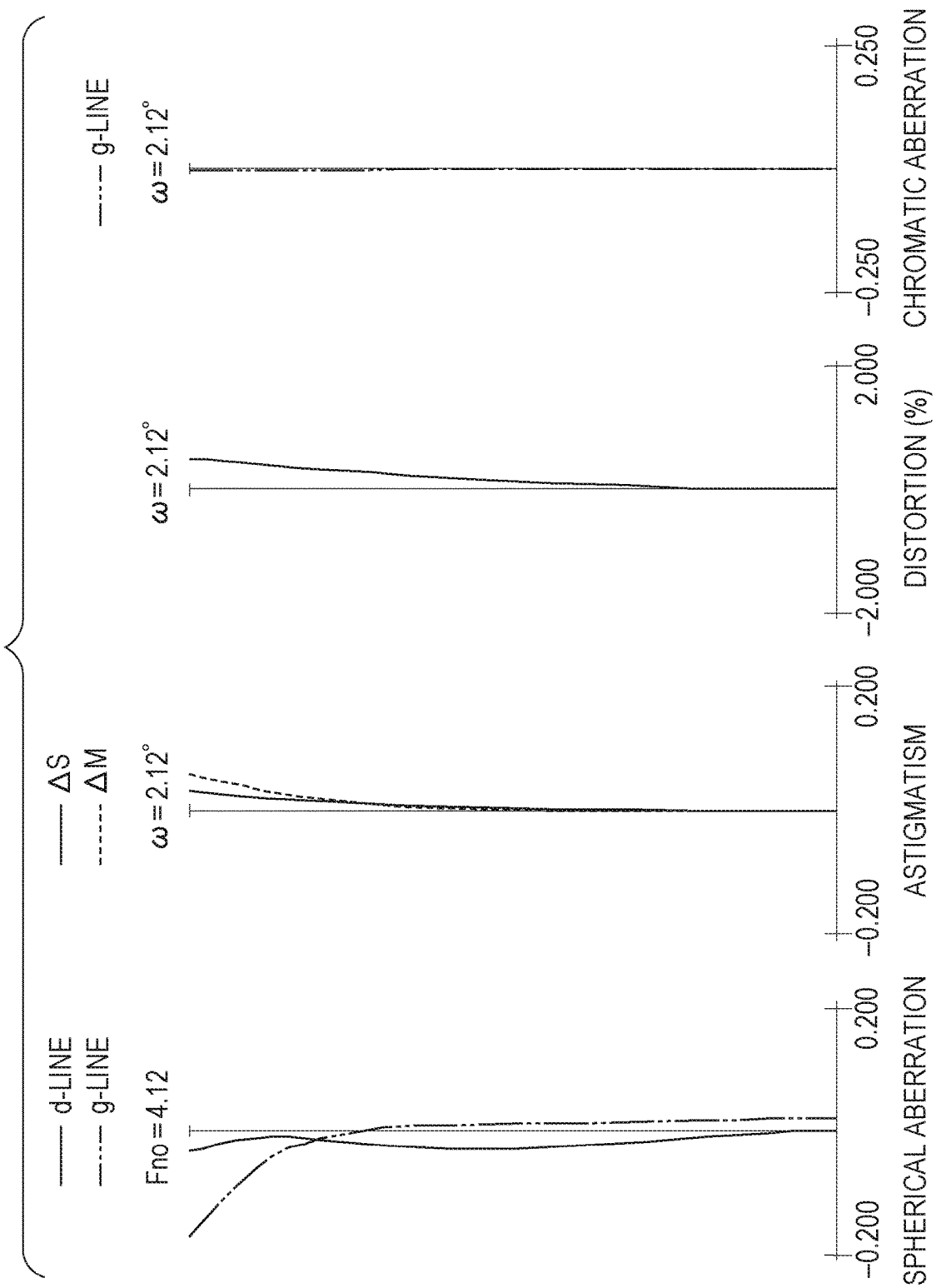
FIG. 12 is an aberration diagram of Embodiment 6 that is in focus at infinity.
Figure 13:
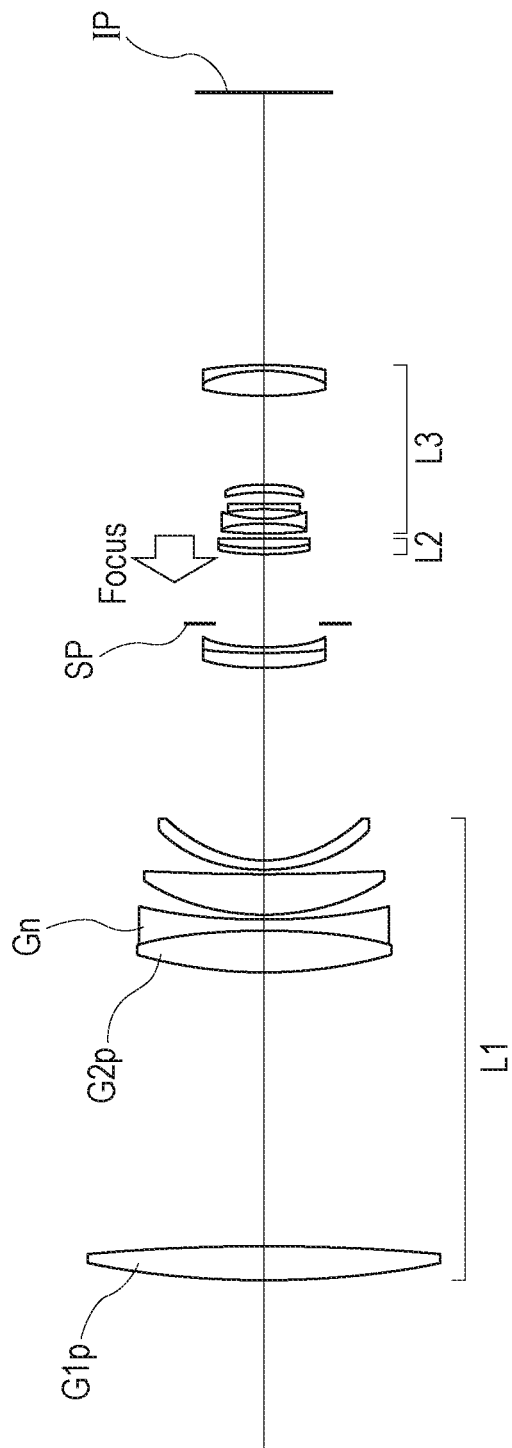
FIG. 13 is a lens sectional view of an optical system of Embodiment 7.
Figure 14:
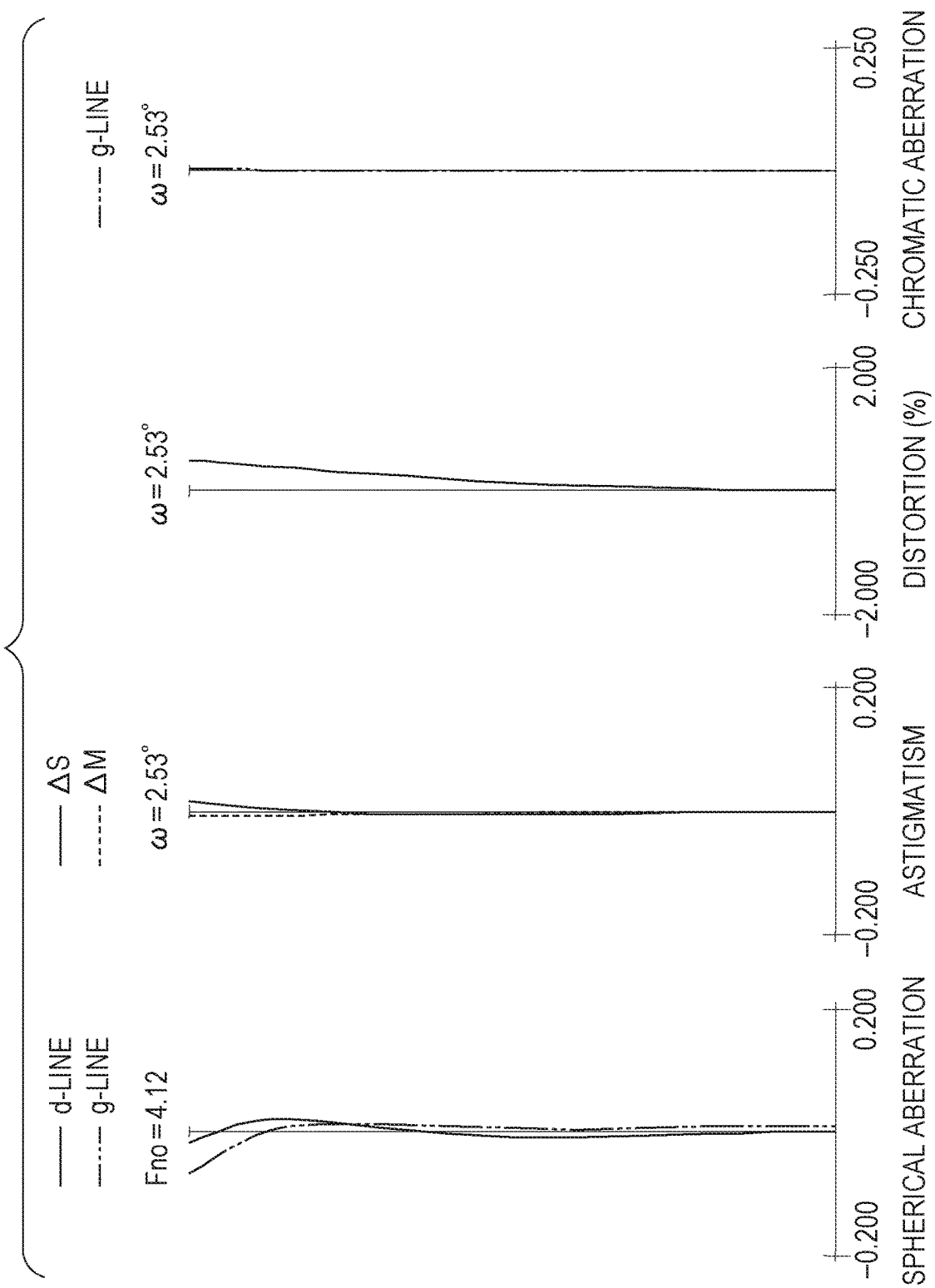
FIG. 14 is an aberration diagram of Embodiment 7 that is in focus at infinity.

FIG. 9 is a lens sectional view of an optical system of Embodiment 5. FIG. 10 is an aberration diagram of Embodiment 5 that is in focus at infinity. FIG. 11 is a lens sectional view of an optical system of Embodiment 6. FIG. 12 is an aberration diagram of Embodiment 6 that is in focus at infinity. FIG. 13 is a lens sectional view of an optical system of Embodiment 7, FIG. 14 is an aberration diagram of Embodiment 7 that is in focus at infinity.

Figure 15:
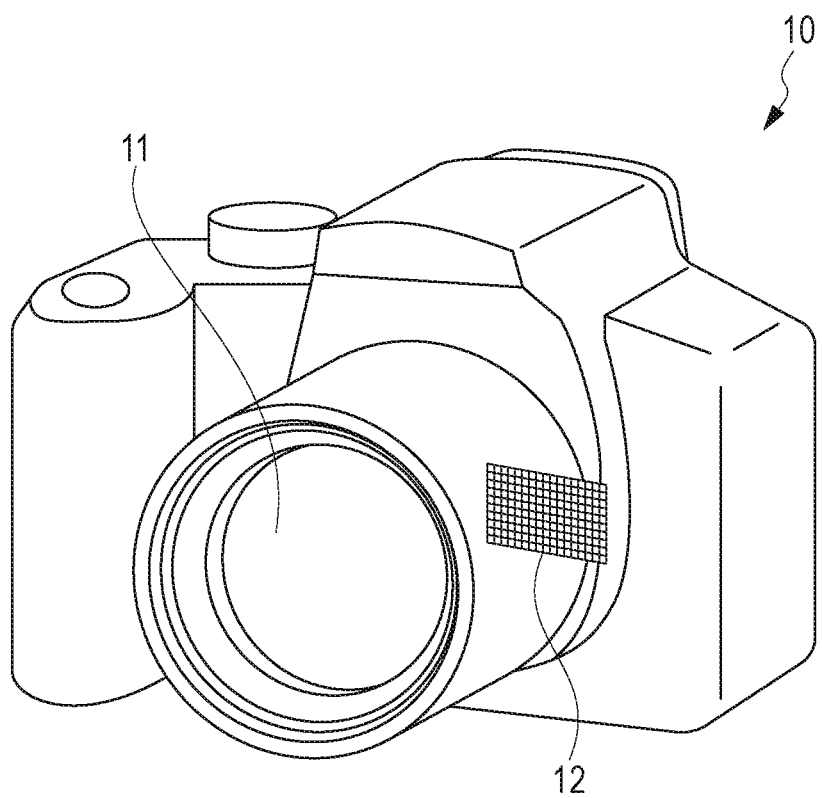
FIG. 15 is a schematic view of a main part of an image pickup apparatus of an embodiment.

FIG. 15 is a schematic view of a main part of an image pickup apparatus having an optical system of an embodiment. The optical system of each embodiment is a shooting lens system used in an image pickup apparatus such as a video camera, a digital camera, a silver-halide film camera, or a TV camera. In the lens sectional views, the left side is the object side (front side), and the right side is the image side (rear side). In the lens sectional views, when i denotes the order of lens units from the object side to the image side, Li denotes the i-th lens unit.

The optical system of each embodiment includes, in order from the object side to the image side, a first lens unit L1 having positive refractive power, a second lens unit L2 having negative refractive power, and a third lens unit L3 having positive or negative refractive power. During focusing, the second lens unit L2 moves, and the distances between adjacent lens units change. The term "lens unit" as used herein means one or more lens elements that move integrally during focusing. It only has to have one or more lenses, and does not necessarily have to have a plurality of lenses.

In each embodiment, SP denotes an aperture stop. In the optical systems of Embodiments 1 to 3 and 7, the aperture stop SP is arranged between the first lens unit L1 and the second lens unit L2. In the optical systems of Embodiments 4 and 5, the aperture stop SP is arranged between the second lens unit L2 and the third lens unit L3. In the optical system of Embodiment 6, the aperture stop SP is arranged inside the first lens unit L1. IP denotes an image plane. When the optical system is used as an image pickup optical system of a video camera or a digital camera, the image plane IP corresponds to a solid-state image pickup element (photoelectric conversion element) such as a CCD sensor or a CMOS sensor. When the optical system of an embodiment is used as an image pickup optical system of a silver-halide film camera, the image plane IP corresponds to a film plane.

In the spherical aberration diagrams, Fno denotes an F-number, and spherical aberrations for the d-line (wavelength 587.6 nm) and the g-line (wavelength 435.8 nm) are shown. In the astigmatism diagrams, ΔS denotes the amount of astigmatism in a sagittal image plane, and ΔM denotes the amount of astigmatism in a meridional image plane. The distortion is for the d-line. In the chromatic aberration diagrams, chromatic aberration for the g-line is shown. ω denotes an image pickup half angle of view.

In each embodiment, as shown by arrow in the lens sectional view, during the focusing from infinity to close distance, the second lens unit L2 moves, and the distances between adjacent lens units change. In the optical system of each embodiment, the second lens unit L2 corresponds to a focusing unit. In the optical systems of Embodiments 1 to during the focusing from infinity to close distance, the second lens unit L2 moves to the image side. In the optical systems of Embodiments 4 to 7, during the focusing from infinity to close distance, the second lens unit L2 moves to the object side.

In the optical system of each embodiment, the imaging position can be changed by using some lenses of the optical system as an image stabilizing unit and moving the image stabilizing unit in a direction having a component perpendicular to the optical axis. Image blur correction can thereby be performed. Any one of the first lens unit L1, the second lens unit L2, and the third lens unit L3 may be used as an image stabilizing unit, or some of the lenses included in a specific lens unit may be used as an image stabilizing unit.

Next, a method for reducing chromatic aberration in the optical system of the present embodiment will be described. Abbe number vd and partial dispersion ratio θgF are known as parameters relating to correction of chromatic aberration in an optical system. Abbe number vd and partial dispersion ratio θgF are expressed as:

$$vd=(Nd-1)/(NF-NC), \text{ and}$$

$$\theta gF=(Ng-NF)/(NF-NC),$$

where Ng, NF, NC, and Nd are respectively refractive indices of a material for the g-line (wavelength 435.8 nm), F-line (wavelength 486.1 nm), C-line (wavelength 656.3 nm), and d-line (wavelength 587.6 nm).

Next, anomalous dispersion of a material used for lenses will be described. When ΔθgF=θgF−(0.6438−0.001682×vd) . . . (A), the numerical value of expression (A) is close to zero in many materials. The greater the absolute value of the numerical value of expression (A), the higher the anomalous dispersion of a material. By using a material having a small numerical value of expression (A) as a material for negative lenses arranged in a lens unit having positive refractive power as a whole, the secondary spectrum of chromatic aberration (chromatic aberration for the g-line) can be satisfactorily corrected. By using a material having a large numerical value of expression (A) as a material for positive lenses arranged in a lens unit having positive refractive power as a whole, the secondary spectrum of chromatic aberration can be satisfactorily corrected.

In general, by using a high dispersion material as a material for negative lenses arranged in a lens unit having positive refractive power as a whole, the correction effect of primary chromatic aberration can be obtained. Although positive lenses arranged in a lens unit having positive refractive power as a whole are prone to primary chromatic aberration, the amount of occurrence of primary chromatic aberration can be reduced by using a low dispersion material as a material for positive lenses. By appropriately setting the balance between the amount of occurrence of primary chromatic aberration and the amount of correction of primary chromatic aberration in an optical system having positive refractive power as a whole, primary chromatic aberration of the entire optical system can be reduced.

In the optical system of each embodiment, the distance between the positive lens G1p arranged on the most object side among positive lenses included in the optical system and the negative lens Gn located on the most object side among negative lenses arranged on the image side of the positive lens G1p is increased. The effective diameter of the negative lens Gn is thereby reduced. Increasing the distance between the positive lens G1p and the negative lens Gn decreases the height of the axial ray incident on the negative lens Gn, and therefore decreases the correction effect of spherical aberration in the negative lens Gn. Therefore, the spherical aberration occurring in the positive lens G1p needs to be reduced.

So, in an embodiment, by reducing the refractive index of the material of the positive lens G1p, the refractive power of the positive lens G1p is weakened, and the spherical aberration occurring in the positive lens G1p is reduced. However, weakening the refractive power of the positive lens G1p makes the amount of occurrence of primary chromatic aberration in the positive lens G1p insufficient relative to the amount of correction of primary chromatic aberration in the negative lens Gn. So, in the optical system of an embodiment, the amount of occurrence of primary chromatic aberration in the positive lens G1p is increased by forming the positive lens G1p of a relatively high dispersion material.

The optical system of each embodiment satisfies the following conditional expressions (1) to (4):

$$LD/f<1.00 \quad (1),$$

$$0.25<Dpn/LD<0.50 \quad (2),$$

$$1.45<Nd1p<1.68 \quad (3), \text{ and}$$

$$30.0<vd1p<50.0 \quad (4)$$

The refractive index and Abbe number of the material of the positive lens G1p arranged on the most object side among positive lenses included in the optical system are respectively denoted as Nd1p and vd1p. The distance on the optical axis between the negative lens Gn arranged an the most object side among negative lenses arranged on the image side of the positive lens G1p and the positive lens G1p is denoted as Dpn. The focal length of the entire system is denoted as f, and the distance on the optical axis from the object side lens surface of the lens arranged on the most object side to the image plane (hereinafter referred to as total lens length) is denoted as LD.

Conditional expression (1) shows that the total lens length LD is shorter than the focal length f of the entire optical system. In general, an optical system mounted in a telephoto lens having a reduced total lens length has a focal length longer than the total lens length LD. It is undesirable that the total lens length LD is so long that the upper limit of conditional expression (1) is exceeded, because the optical system is increased in size in the optical axis direction.

Conditional expression (2) defines the ratio of the distance Dpn on the optical axis between the negative lens Gn arranged on the most object side among negative lenses arranged on the image side of the positive lens G1p and the positive lens G1p to the total lens length LD. It is undesirable that the distance Dpn is so short that the lower limit of conditional expression (2) is exceeded, because the distance between the positive lens G1p and the negative lens Gn is too short, the effective diameter of the negative lens Gn increases, and the weight of the negative lens Gn increases. It is undesirable that the distance Dun is so longer that the upper limit of conditional expression. (2) is exceeded, because the height of the axial ray incident on the negative lens Gn decreases, and it is difficult to satisfactorily correct the spherical aberration in the negative lens Gn.

Conditional expression (3) defines the refractive index Nd1p of the material of the positive lens G1p. When a material having a refractive index exceeding the lower limit of conditional expression (3) is used as a material for the positive lens G1p, the refractive power of the positive lens G1p is too weak. As a result, it is difficult to sufficiently generate primary chromatic aberration, and it is difficult to reduce primary chromatic aberration in the entire optical system. This is undesirable. It is undesirable that a material having a refractive index exceeding the upper limit of conditional expression (3) is used as a material for the positive lens G1p, because a large amount of spherical aberration occurs in the positive lens G1p.

Conditional expression (4) defines the Abbe number vd1p of the material of the positive lens G1p. It is undesirable that a material having an Abbe number exceeding the lower limit of conditional expression (4) is used as a material for the positive lens G1p, because excessive chromatic aberration occurs in the positive lens G1p, and it is difficult to appropriately correct the chromatic aberration occurring in the positive lens G1p in the negative lens Gn. When a material having an Abbe number exceeding the upper limit of conditional expression (4) is used, the amount of chromatic aberration occurring in the positive lens G1p is insufficient, and the chromatic aberration to be generated in the positive lens arranged on the image side of the positive lens G1p increases. As a result, the positive lens arranged on the image side of the positive lens G1p needs to be arranged on the more object side, and the increase in weight of the optical system is caused. This is undesirable.

In each embodiment, as described above, elements are appropriately set so as to satisfy Conditional expressions (1) to (4). An optical system that is lightweight and in which aberrations such as spherical aberration and chromatic aberration are satisfactorily corrected can thereby be obtained.

In each embodiment, it is preferable that the numerical value ranges of Conditional expressions (1) to (4) be set as follows:

$$LD/f<0.98 \quad (1a),$$

$$0.25<Dpn/LD<0.45 \quad (2a),$$

$$1.48<Nd1p<1.65 \quad (3a), \text{ and}$$

$$32.0<vd1p<49.5 \quad (4a).$$

It is more preferable that the numerical value ranges of Conditional expressions (1) to (4) be set as follows:

$$LD/f<0.96 \quad (1b),$$

$$0.25<Dpn/LD<0.40 \quad (2b),$$

$$1.52<Nd1p<1.62 \quad (3b), \text{ and}$$

$$34.0<vd1p<49.0 \quad (4b).$$

The positive lens G1p can have a meniscus shape convex toward the object side. By making the positive lens G1p have a meniscus shape, the amount of occurrence of spherical aberration can be reduced compared to a case where the positive lens G1p has a biconvex shape.

In each embodiment, it is more preferable that one or more of the following conditional expressions be satisfied:

$$0.000 < \theta gF\_G1p - 0.6438 + 0.001682 \times vd1p < 0.015 \quad (5),$$

$$0.30 < (R12-R11)/(R12+R11) < 1.00 \quad (6),$$

$$0.30 < f1p/f < 1.00 \quad (7),$$

$$20.0 < vdn < 45.0 \quad (8),$$

$$1.65 < Ndn < 2.20 \quad (9),$$

$$20.00 < \Sigma(vdni/fni)/\Sigma(1/fni) < 45.00. \quad (10),$$

$$0.17 < Dpp/LD < 0.50 \quad (11),$$

$$0.020 < \theta gF\_G2p - 0.6438 + 0.001682 \times vd2p < 0.100 \quad (12),$$

$$vd2p > 73.0 \quad (13),$$

$$0.20 < f2p/f1p < 0.80 \quad (14), \text{ and}$$

$$0.15 < f2p/f < 0.60 \quad (15).$$

The partial dispersion ratio of the material of the positive lens G1$p$ is denoted as $\theta gF\_G1p$, the radius of curvature of the object side lens surface of the positive lens G1$p$ is denoted as R11, the radius of curvature of the image side lens surface of the positive lens G1$p$ is denoted as R12, the focal length of the positive lens G1$p$ is denoted as f1$p$, and the focal length of the entire system is denoted as f. The Abbe number and the refractive index of the material of the negative lens Gn are respectively denoted as vdn, and Ndn. The Abbe number of the material of the i-th negative lens counted from the object side among negative lenses arranged between the positive lens G1$p$ and the focusing unit is denoted as vdni, and the focal length of the i-th negative lens is denoted as fni. The distance on the optical axis between the positive lens G2$p$ located on the most object side among positive lenses arranged on the image side of the positive lens G1$p$ and the positive lens G1$p$ is denoted as Dpp, and the Abbe number and the partial dispersion ratio of the material of the positive lens G2$p$ are respectively denoted as vd2$p$ and $\theta gF\_G2p$. The focal length of the positive lens G2$p$ is denoted as f2$p$.

Conditional expression (5) defines the anomalous dispersion $\Delta\theta gF\_G1p$ of the material of the positive lens G1$p$. By forming the positive lens G1$p$ of a material having high anomalous dispersion, the secondary spectrum can be satisfactorily corrected. It is undesirable that a material having an anomalous dispersion exceeding the lower limit of Conditional expression (5) is used, because it is difficult to sufficiently correct the secondary spectrum, and as a result, it is difficult to reduce the secondary spectrum in the entire optical system. It is undesirable that a material having an anomalous dispersion exceeding the upper limit of Conditional expression (5) is used, because it is difficult to reduce the secondary spectrum in the entire optical system.

Conditional expression (6) defines the shape of the positive lens G1$p$. When the lower limit of Conditional expression (6) is exceeded, the difference in radius of curvature between the object side lens surface and the image side lens surface of the positive lens G1$p$ is too small, and the positive refractive power of the positive lens G1$p$ is too weak. As a result, the effective diameter of the lens arranged on the image side of the positive lens G1$p$ increases, and the increase in weight of the entire optical system is caused. This is undesirable. When the upper limit of Conditional expression (6) is exceeded, the difference in radius of curvature between the object side lens surface and the image side lens surface of the positive lens G1$p$ is too large, and a large amount of spherical aberration and longitudinal chromatic aberration occurs. This is undesirable.

Conditional expression (7) defines the ratio of the focal length f1$p$ of the positive lens G1$p$ and the focal length f of the entire system. When the focal length f1$p$ of the positive lens G1$p$ is so short that the lower limit of Conditional expression (7) is exceeded, the refractive power of the positive lens G1$p$ is too strong. As a result, a large amount of spherical aberration and longitudinal chromatic aberration occurs in the positive lens G1$p$. This is undesirable. When the focal length f1$p$ of the positive lens G1$p$ is so long that the upper limit of Conditional expression (7) is exceeded, the refractive power of the positive lens G1$p$ is too weak. As a result, it is difficult to sufficiently generate primary chromatic aberration, and as a result, it is difficult to reduce primary chromatic aberration in the entire optical system. This is undesirable.

Conditional expression (8) defines the Abbe number vdGn of the material of the negative lens Gn. It is undesirable that the lower limit of Conditional expression (8) is exceeded, because chromatic aberration is excessively corrected in the negative lens Gn. It is undesirable that the upper limit of Conditional expression (8) is exceeded, because it is difficult to sufficiently correct chromatic aberration in the negative lens Gn.

Conditional expression (9) defines the refractive index Ndn of the material of the negative lens Gn. It is undesirable that the lower limit of Conditional expression (9) is exceeded, because it is difficult to satisfactorily correct spherical aberration. A material having a refractive index exceeding the upper limit of Conditional expression (9) lacks in practicality as a shooting optical system.

Conditional expression (10) defines the relationship between the focal lengths fni of the negative lenses arranged between the positive lens G1$p$ and the focusing unit, and the Abbe numbers vdni of the materials of the negative lenses arranged between the positive lens G1$p$ and the focusing unit. It is undesirable that the lower limit of Conditional expression (10) is exceeded, because chromatic aberration is excessively corrected in the negative lenses arranged between the positive lens G1$p$ and the focusing unit. It is undesirable that the upper limit of Conditional expression (10) is exceeded, because it is difficult to satisfactorily correct chromatic aberration in the negative lenses arranged between the positive lens G1$p$ and the focusing unit.

Conditional expression (11) defines the ratio of the distance Dpp on the optical axis between the positive lens G2$p$ located on the most object side among positive lenses arranged on the image side of the positive lens G1$p$ and the positive lens G1$p$ to the total lens length LD. It is undesirable that the distance Dpp is so short that the lower limit of Conditional expression (11) is exceeded, because the effective diameter of the positive lens G2$p$ increases, and the increase in weight of the positive lens G2$p$ is caused. When the distance Dpp is so long that the upper limit of Conditional expression (11) is exceeded, because the height of the axial ray incident on the positive lens G2$p$ decreases, and it is difficult to sufficiently generate primary chromatic aberration in the positive lens G2$p$. As a result, it is difficult to reduce primary chromatic aberration in the entire optical system. This is undesirable.

Conditional expression (12) defines the anomalous dispersion $\Delta\theta gF\_G2p$ of the material of the positive lens G2$p$. By forming the positive lens G2$p$ of a material having a high anomalous dispersion, the correction effect of the secondary spectrum can be obtained. It is undesirable that a material having an anomalous dispersion exceeding the upper limit of conditional expression (12) is used as a material for the positive lens G2p, because the secondary spectrum is excessively corrected, and it is difficult to reduce the secondary spectrum in the entire optical system. It is undesirable that a material having an anomalous dispersion exceeding the lower limit of conditional expression (12) is used as a material for the positive lens G2p, because it is difficult to satisfactorily correct the secondary spectrum.

Conditional expression (13) defines the Abbe number vd2p of the material of the positive lens G2p. It is undesirable that a material having an Abbe number exceeding the lower limit of conditional expression (13), because chromatic aberration occurs excessively in the positive lens G2p.

Conditional expression (14) defines the ratio of the focal length f2p of the positive lens G2p to the focal length f1p of the positive lens G1p. When the focal length f2p of the positive lens G2p is so short that the lower limit of Conditional expression (14) is exceeded, the refractive power of the positive lens G2p is too strong. As a result, a large amount of spherical aberration and longitudinal chromatic aberration occurs in the positive lens G2p. This is undesirable. When the focal length f2p of the positive lens G2p is so long that the upper limit of Conditional expression (14) is exceeded, the refractive power of the positive lens G2p is too weak. As a result, the effective diameter of the lens arranged on the image side of the positive lens G2p, and the increase in weight of the entire optical system is caused. This is undesirable.

Conditional expression (15) defines the ratio of the focal length f2p of the positive lens G2p and the focal length f of the entire system. When the focal length f2p of the positive lens G2p is so short that the lower limit of Conditional expression (15) is exceeded, the refractive power of the positive lens G2p is too strong. As a result, a large amount of spherical aberration and longitudinal chromatic aberration occurs in the positive lens G2p. This is undesirable. When the focal length f2p of the positive lens G2p is so long that the upper limit of Conditional expression (14) is exceeded, the refractive power of the positive lens G2p is too weak. As a result, the effective diameter of the lens arranged on the image side of the positive lens G2p increases, and the increase in weight of the entire optical system is caused. This is undesirable.

It is preferable that the numerical value ranges of Conditional expressions (5) to (15) be set as follows:

$$0.0010 < \theta gF\_G1p - 0.6438 + 0.001682 \times vd1p < 0.0120 \quad (5a),$$

$$0.55 < (R12 - R11)/(R12 + R11) < 0.82 \quad (6a),$$

$$0.40 < f1p/f < 0.90 \quad (7a),$$

$$22.00 < vdn < 36.00 \quad (8a),$$

$$1.70 < Ndn < 2.10 \quad (9a),$$

$$23.00 < \Sigma(vdni/fni)/\Sigma(1/fni) < 40.00 \quad (10a),$$

$$0.20 < Dpp/LD < 0.45 \quad (11a),$$

$$0.030 < \theta gF\_G2p - 0.6438 + 0.001682 \times vd2p < 0.080 \quad (12a),$$

$$vd2p > 75.0 \quad (13a),$$

$$0.30 < f2p/f1p < 0.70 \quad (14a), \text{ and}$$

$$0.20 < f2p/f < 0.55 \quad (15a).$$

It is more preferable that the numerical value ranges of Conditional expressions (5) to (15) be set as follows:

$$0.0012 < \theta gF\_G1p - 0.6438 + 0.001682 \times vd1p < 0.0100 \quad (5b),$$

$$0.60 < (R12 - R11)/(R12 + R11) < 0.80 \quad (6b),$$

$$0.45 < f1p/f < 0.88 \quad (7b),$$

$$24.00 < vdn < 35.50 \quad (8h),$$

$$1.73 < Ndn < 1.90 \quad (9b),$$

$$25.00 < \Sigma(vdni/fni)/\Sigma(1/fni) < 37.00 \quad (10b),$$

$$0.22 < Dpp/LD < 0.40 \quad (11b),$$

$$0.040 < \theta gF\_G2p - 0.6438 + 0.001682 \times vd2p < 0.070 \quad (12b),$$

$$vd2p > 83.0 \quad (13b),$$

$$0.38 < f2p/f1p < 0.65 \quad (14h), \text{ and}$$

$$0.25 < f2/f < 0.50 \quad (15b).$$

Next, the following are Numerical Embodiments 1 to 7 respectively corresponding to Embodiments 1 to 7. In each numerical embodiment, i denotes the order of optical surfaces from the object side. ri denotes the curvature radius of the i-th optical surface (i-th surface), di denotes the distance between the i-th surface and the (i+1)th surface, and ndi and vdi respectively denote the refractive index and the Abbe number of the material of the i-th optical member for the d-line.

In each embodiment, back focus (BF) is the air-conversion distance from the most image side surface of the optical system to the image side. Table 1 and Table 2 show the relationships between the above-described conditional expressions and Numerical Examples. In Table 1 and Table 2, ΔθgF_Gi shows the numerical value of θgF_Gi−(0.6438−0.001682×vdi).

In each embodiment, a protective glass for protecting lenses may be arranged on the object side of the first lens unit L1. A protective glass having an extremely weak refractive power shall not be included in the first lens unit L1.

Numerical Embodiment 1 unit mm surface data

| surface number | r | d | nd | vd | effective diameter |
|---|---|---|---|---|---|
| 1 | 150.642 | 16.15 | 1.59270 | 35.3 | 135.36 |
| 2 | 730.042 | 100.00 | | | 134.20 |
| 3 | 107.703 | 14.79 | 1.43387 | 95.1 | 84.27 |
| 4 | −328.442 | 0.27 | | | 82.15 |
| 5 | −318.403 | 3.00 | 1.85478 | 24.8 | 81.94 |
| 6 | 87.265 | 3.08 | | | 76.51 |
| 7 | 88.737 | 12.63 | 1.43387 | 95.1 | 76.87 |
| 8 | −1026.629 | 35.00 | | | 76.22 |
| 9 | 68.568 | 6.10 | 1.89286 | 20.4 | 62.07 |
| 10 | 127.179 | 5.00 | | | 60.58 |
| 11 | 68.368 | 2.30 | 1.65412 | 39.7 | 55.04 |
| 12 | 43.418 | 1.15 | | | 51.09 |
| 13 | 48.830 | 7.97 | 1.43387 | 95.1 | 51.07 |
| 14 | 133.424 | 7.57 | | | 49.03 |
| 15 (stop) | ∞ | 5.89 | | | 44.73 |
| 16 | −3151.717 | 1.87 | 1.91082 | 35.3 | 40.00 |
| 17 | 61.271 | 30.34 | | | 38.04 |
| 18 | 97.234 | 1.76 | 1.92286 | 20.9 | 33.23 |
| 19 | 63.011 | 9.17 | 1.56732 | 42.8 | 32.60 |

-continued

| unit mm | | | | | |
|---|---|---|---|---|---|
| 20 | −96.758 | 1.07 | | | 33.13 |
| 21 | 110.488 | 4.14 | 1.85025 | 30.1 | 32.94 |
| 22 | −106.157 | 1.44 | 1.59522 | 67.7 | 32.67 |
| 23 | 36.770 | 5.26 | | | 31.17 |
| 24 | −77.293 | 1.47 | 1.72916 | 54.7 | 31.20 |
| 25 | 75.820 | 4.11 | | | 32.49 |
| 26 | 89.505 | 10.00 | 1.64769 | 33.8 | 36.21 |
| 27 | −216.973 | 0.15 | | | 38.52 |
| 28 | 77.954 | 12.44 | 1.73800 | 32.3 | 39.99 |
| 29 | −58.563 | 2.00 | 1.80809 | 22.8 | 39.98 |
| 30 | ∞ | 3.00 | | | 40.13 |
| 31 | ∞ | 2.20 | 1.51633 | 64.1 | 42.00 |
| 32 | ∞ | 60.70 | | | 42.00 |

| | |
|---|---|
| image plane | ∞ |
| focal length | 392.55 |
| F-number | 2.90 |
| half angle of view | 3.15 |
| image height | 21.64 |
| total lens length | 372.00 |
| BF | 60.70 |
| entrance pupil position | 532.27 |
| exit pupil position | −109.30 |
| front principal point position | 18.38 |
| rear principal point position | −331.85 | single lens data

| lens | starting surface | focal length |
|---|---|---|
| 1 | 1 | 316.96 |
| 2 | 3 | 188.88 |
| 3 | 5 | −79.86 |
| 4 | 7 | 188.90 |
| 5 | 9 | 158.84 |
| 6 | 11 | −188.77 |
| 7 | 13 | 172.59 |
| 8 | 16 | −65.97 |
| 9 | 18 | −198.89 |
| 10 | 19 | 68.69 |
| 11 | 21 | 64.24 |
| 12 | 22 | −45.71 |
| 13 | 24 | −52.28 |
| 14 | 26 | 99.10 |
| 15 | 28 | 47.14 |
| 16 | 29 | −72.47 |

Numerical Embodiment 2 unit mm surface data

| surface number | r | d | nd | vd | effective diameter |
|---|---|---|---|---|---|
| 1 | 99.464 | 14.87 | 1.59270 | 3.3 | 101.04 |
| 2 | 456.909 | 64.58 | | | 99.29 |
| 3 | 80.681 | 11.90 | 1.43387 | 95.1 | 62.00 |
| 4 | −167.967 | 0.15 | | | 60.11 |
| 5 | −166.869 | 2.30 | 1.85478 | 24.8 | 59.92 |
| 6 | 51.072 | 0.15 | | | 54.95 |
| 7 | 50.726 | 11.60 | 1.43387 | 95.1 | 55.04 |
| 8 | −770.506 | 10.68 | | | 54.62 |
| 9 | 59.715 | 3.81 | 1.89286 | 20.4 | 50.66 |
| 10 | 74.063 | 8.36 | | | 49.33 |
| 11 | 58.185 | 2.00 | 1.65412 | 39.7 | 45.60 |
| 12 | 45.596 | 1.04 | | | 43.86 |
| 13 | 51.918 | 6.42 | 1.90366 | 31.3 | 43.79 |
| 14 | 206.154 | 3.00 | | | 42.24 |
| 15 (stop) | ∞ | 2.91 | | | 40.40 |
| 16 | 2015.159 | 1.90 | 1.91082 | 35.3 | 37.51 |
| 17 | 32.641 | 3.50 | 1.84666 | 23.8 | 34.33 |
| 18 | 43.038 | 17.66 | | | 33.42 |
| 19 | 64.610 | 5.62 | 1.49700 | 81.5 | 31.81 |

-continued

| unit mm | | | | | |
|---|---|---|---|---|---|
| 20 | −78.046 | 1.00 | | | 31.84 |
| 21 | 469.814 | 3.84 | 1.85478 | 24.8 | 30.43 |
| 22 | −64.210 | 1.50 | 1.60311 | 60.6 | 30.18 |
| 23 | 33.512 | 7.59 | | | 28.87 |
| 24 | −47.827 | 1.50 | 1.60311 | 60.6 | 29.44 |
| 25 | 93.980 | 2.80 | | | 31.60 |
| 26 | 77.014 | 6.40 | 1.59551 | 39.2 | 36.97 |
| 27 | −82.425 | 0.42 | | | 37.69 |
| 28 | 108.793 | 10.03 | 1.85478 | 24.8 | 38.99 |
| 29 | −32.591 | 2.00 | 1.89286 | 20.4 | 38.97 |
| 30 | 1236.437 | 0.19 | | | 39.14 |
| 31 | ∞ | 2.20 | 1.51633 | 64.1 | 40.00 |
| 32 | ∞ | 62.03 | | | 40.00 |

| | |
|---|---|
| image plane | ∞ |
| focal length | 292.46 |
| F-number | 2.90 |
| half angle of view | 4.23 |
| image height | 21.64 |
| total lens Length | 273.98 |
| BF | 62.03 |
| entrance pupil position | 301.22 |
| exit pupil position | −71.11 |
| front principal point position | −48.75 |
| rear principal point position | −230.43 | single lens data

| lens | starting surface | focal length |
|---|---|---|
| 1 | 1 | 211.24 |
| 2 | 3 | 127.46 |
| 3 | 5 | −45.53 |
| 4 | 7 | 110.16 |
| 5 | 9 | 306.80 |
| 6 | 11 | −343.79 |
| 7 | 13 | 75.30 |
| 8 | 16 | −36.44 |
| 9 | 17 | 138.24 |
| 10 | 19 | 72.07 |
| 11 | 21 | 66.31 |
| 12 | 22 | −36.30 |
| 13 | 24 | −52.35 |
| 14 | 26 | 67.87 |
| 15 | 28 | 30.33 |
| 16 | 29 | −35.54 |

Numerical Embodiment 3 unit mm surface data

| surface number | r | d | nd | vd | effective diameter |
|---|---|---|---|---|---|
| 1 | 178.783 | 15.20 | 1.59270 | 35.3 | 135.31 |
| 2 | 1415.744 | 124.89 | | | 134.26 |
| 3 | 108.327 | 15.15 | 1.43387 | 95.1 | 78.98 |
| 4 | −192.136 | 0.15 | | | 76.97 |
| 5 | −197.207 | 3.00 | 1.85478 | 24.8 | 76.67 |
| 6 | 76.176 | 0.15 | | | 71.84 |
| 7 | 73.738 | 12.64 | 1.43387 | 95.1 | 72.03 |
| 8 | 13386.147 | 11.63 | | | 71.67 |
| 9 | 86.704 | 5.89 | 1.89286 | 20.4 | 68.81 |
| 10 | 159.733 | 33.10 | | | 67.66 |
| 11 | 69.154 | 2.30 | 1.65412 | 39.7 | 49.89 |
| 12 | 45.945 | 1.53 | | | 47.30 |
| 13 | 55.402 | 8.24 | 1.66672 | 48.3 | 47.22 |
| 14 | 2426.623 | 3.00 | | | 45.60 |
| 15 (stop) | ∞ | 2.00 | | | 42.92 |
| 16 | 174.740 | 2.00 | 1.90366 | 31.3 | 40.00 |
| 17 | 37.347 | 4.13 | 1.49700 | 81.5 | 36.73 |
| 18 | 52.890 | 15.51 | | | 35.68 |
| 19 | 87.342 | 4.14 | 1.84666 | 23.8 | 31.49 |

-continued unit mm

| | | | | | |
|---|---|---|---|---|---|
| 20 | 403.419 | 1.07 | | | 31.05 |
| 21 | 95.943 | 4.24 | 1.85478 | 24.8 | 32.55 |
| 22 | −94.709 | 1.50 | 1.76385 | 48.5 | 32.10 |
| 23 | 38.328 | 6.23 | | | 30.47 |
| 24 | −80.394 | 1.50 | 1.76385 | 48.5 | 30.84 |
| 25 | 109.369 | 3.26 | | | 32.09 |
| 26 | 72.385 | 12.53 | 1.67300 | 38.1 | 34.59 |
| 27 | −32.147 | 1.70 | 1.59522 | 67.7 | 35.84 |
| 28 | −300.120 | 0.15 | | | 37.16 |
| 29 | 144.097 | 9.42 | 1.85478 | 24.8 | 37.64 |
| 30 | −34.206 | 2.00 | 1.89286 | 20.4 | 37.67 |
| 31 | 1892.910 | 0.16 | | | 37.94 |
| 32 | ∞ | 2.20 | 1.51633 | 64.1 | 40.00 |
| 33 | ∞ | 61.34 | | | 40.00 |

| | |
|---|---|
| image plane | ∞ |
| focal length | 392.56 |
| F-number | 2.90 |
| half angle of view | 3.15 |
| image height | 21.64 |
| total lens Length | 371.98 |
| BF | 61.34 |
| entrance pupil position | 626.88 |
| exit pupil position | −65.09 |
| front principal point position | −199.43 |
| rear principal point position | −331.22 | single lens data

| lens | starting surface | focal length |
|---|---|---|
| 1 | 1 | 343.67 |
| 2 | 3 | 162.13 |
| 3 | 5 | −63.96 |
| 4 | 7 | 170.85 |
| 5 | 9 | 204.61 |
| 6 | 11 | −217.83 |
| 7 | 13 | 84.92 |
| 8 | 16 | −52.93 |
| 9 | 17 | 234.98 |
| 10 | 19 | 130.88 |
| 11 | 21 | 56.34 |
| 12 | 22 | −35.55 |
| 13 | 24 | −60.45 |
| 14 | 26 | 34.75 |
| 15 | 27 | −60.63 |
| 16 | 29 | 33.15 |
| 17 | 30 | −37.61 |

Numerical Embodiment 4 unit mm surface data

| surface number | r | d | nd | vd | effective diameter |
|---|---|---|---|---|---|
| 1 | 163.339 | 13.35 | 1.59270 | 35.3 | 120.06 |
| 2 | 943.811 | 144.80 | | | 118.94 |
| 3 | 104.653 | 12.00 | 1.43387 | 95.1 | 61.40 |
| 4 | −116.617 | 0.15 | | | 59.82 |
| 5 | −117.086 | 2.30 | 1.85478 | 24.8 | 59.62 |
| 6 | 80.844 | 0.15 | | | 57.15 |
| 7 | 77.117 | 12.13 | 1.43387 | 95.1 | 57.26 |
| 8 | −114.243 | 0.15 | | | 57.03 |
| 9 | 95.689 | 3.57 | 1.89286 | 20.4 | 54.37 |
| 10 | 129.498 | 4.81 | | | 53.26 |
| 11 | −174.822 | 2.00 | 1.48749 | 70.2 | 53.26 |
| 12 | 146.631 | 43.95 | | | 51.87 |
| 13 | 107.088 | 10.02 | 1.64769 | 33.8 | 49.80 |
| 14 | −72.534 | 2.20 | 1.58913 | 61.1 | 49.14 |
| 15 | −4440.551 | 2.95 | | | 47.39 |

-continued unit mm

| | | | | | |
|---|---|---|---|---|---|
| 16 (stop) | ∞ | 8.01 | | | 40.94 |
| 17 | 702.560 | 1.90 | 1.84666 | 23.8 | 36.97 |
| 18 | 47.597 | 7.46 | 1.61340 | 44.3 | 35.58 |
| 19 | −126.474 | 19.15 | | | 35.02 |
| 20 | 122.013 | 3.76 | 1.84666 | 23.8 | 26.80 |
| 21 | −71.635 | 1.40 | 1.76385 | 48.5 | 26.39 |
| 22 | 34.538 | 6.95 | | | 25.37 |
| 23 | −64.820 | 1.40 | 1.76385 | 48.5 | 26.15 |
| 24 | 90.115 | 2.28 | | | 27.35 |
| 25 | 139.671 | 9.08 | 1.73800 | 32.3 | 29.11 |
| 26 | −21.978 | 1.70 | 1.76385 | 48.5 | 30.01 |
| 27 | −232.122 | 0.96 | | | 32.79 |
| 28 | 78.499 | 8.15 | 1.73800 | 32.3 | 34.89 |
| 29 | −47.550 | 1.90 | 1.89286 | 20.4 | 35.24 |
| 30 | −127.714 | 9.43 | | | 35.96 |
| 31 | ∞ | 2.20 | 1.51633 | 64.1 | 40.00 |
| 32 | ∞ | 71.62 | | | 40.00 |

| | |
|---|---|
| image plane | ∞ |
| focal length | 488.82 |
| F-number | 4.10 |
| half angle of view | 2.53 |
| image height | 21.64 |
| total lens length | 411.90 |
| BF | 71.62 |
| entrance pupil position | 760.74 |
| exit pupil position | −81.18 |
| front principal point position | −314.21 |
| rear principal point position | −417.20 | single lens data

| lens | starting surface | focal length |
|---|---|---|
| 1 | 1 | 331.15 |
| 2 | 3 | 129.25 |
| 3 | 5 | −55.65 |
| 4 | 7 | 108.19 |
| 5 | 9 | 391.00 |
| 6 | 11 | −163.25 |
| 7 | 13 | 68.26 |
| 8 | 14 | −125.19 |
| 9 | 17 | −60.38 |
| 10 | 18 | 57.31 |
| 11 | 20 | 53.79 |
| 12 | 21 | −30.33 |
| 13 | 23 | −49.16 |
| 14 | 25 | 26.36 |
| 15 | 26 | −31.89 |
| 16 | 28 | 41.26 |
| 17 | 29 | −85.80 |

Numerical Embodiment 5 unit mm surface data

| surface number | r | d | nd | vd | effective diameter |
|---|---|---|---|---|---|
| 1 | 168.552 | 14.91 | 1.59270 | 35.3 | 133.65 |
| 2 | 853.592 | 122.18 | | | 132.49 |
| 3 | 148.612 | 11.95 | 1.43387 | 95.1 | 81.00 |
| 4 | −254.303 | 0.15 | | | 79.55 |
| 5 | −257.480 | 3.20 | 1.85478 | 24.8 | 79.38 |
| 6 | 141.530 | 0.15 | | | 76.27 |
| 7 | 127.364 | 12.78 | 1.43387 | 95.1 | 76.25 |
| 8 | −174.232 | 0.15 | | | 75.68 |
| 9 | 577.170 | 3.41 | 1.89286 | 20.4 | 72.87 |
| 10 | 4707.875 | 3.60 | | | 72.09 |
| 11 | −190.967 | 3.00 | 1.80400 | 46.6 | 72.07 |
| 12 | 1388.400 | 88.70 | | | 71.03 |
| 13 | 145.654 | 7.22 | 1.59551 | 39.2 | 58.51 |

-continued unit mm

| | | | | | |
|---|---|---|---|---|---|
| 14 | −226.906 | 2.80 | 1.67790 | 55.3 | 57.84 |
| 15 | 984.208 | 3.28 | | | 56.57 |
| 16 (stop) | ∞ | 63.32 | | | 45.47 |
| 17 | −414.599 | 1.20 | 1.76385 | 48.5 | 20.91 |
| 18 | 29.784 | 4.80 | 1.54814 | 45.8 | 20.45 |
| 19 | −119.234 | 2.00 | | | 20.87 |
| 20 | 99.170 | 3.22 | 1.78472 | 25.7 | 25.23 |
| 21 | −62.702 | 1.30 | 1.76385 | 48.5 | 25.08 |
| 22 | 48.094 | 3.54 | | | 24.53 |
| 23 | −80.964 | 1.30 | 1.76385 | 48.5 | 24.69 |
| 24 | 140.808 | 1.27 | | | 25.34 |
| 25 | 57.182 | 13.30 | 1.67300 | 38.1 | 24.00 |
| 26 | −35.514 | 1.30 | 1.59522 | 67.7 | 25.49 |
| 27 | 74.378 | 17.60 | | | 26.08 |
| 28 | 112.883 | 7.02 | 1.65412 | 39.7 | 33.62 |
| 29 | −43.326 | 1.70 | 1.89286 | 20.4 | 33.92 |
| 30 | −99.977 | 11.95 | | | 34.71 |
| 31 | ∞ | 2.20 | 1.51633 | 64.1 | 40.00 |
| 32 | ∞ | 71.54 | | | 40.00 |

| | |
|---|---|
| image plane | ∞ |
| focal length | 778.70 |
| F-number | 5.83 |
| half angle of view | 1.59 |
| image height | 21.64 |
| total lens length | 486.03 |
| BF | 71.54 |
| entrance pupil position | 834.02 |
| exit pupil position | −145.46 |
| front principal point position | −1181.64 |
| rear principal point position | −707.16 | single lens data

| lens | starting surface | focal length |
|---|---|---|
| 1 | 1 | 351.50 |
| 2 | 3 | 218.15 |
| 3 | 5 | −106.45 |
| 4 | 7 | 171.79 |
| 5 | 9 | 736.46 |
| 6 | 11 | −208.62 |
| 7 | 13 | 150.05 |
| 8 | 14 | −271.75 |
| 9 | 17 | −36.34 |
| 10 | 18 | 43.98 |
| 11 | 20 | 49.38 |
| 12 | 21 | −35.45 |
| 13 | 23 | −67.13 |
| 14 | 25 | 34.55 |
| 15 | 26 | −40.21 |
| 16 | 28 | 48.73 |
| 17 | 29 | −86.87 |

Numerical Embodiment 6 unit mm surface data

| surface number | r | d | nd | vd | effective diameter |
|---|---|---|---|---|---|
| 1 | 302.631 | 13.68 | 1.53172 | 48.8 | 141.98 |
| 2 | −1528.554 | 150.00 | | | 141.38 |
| 3 | 111.159 | 17.83 | 1.43387 | 95.1 | 91.72 |
| 4 | −262.152 | 0.30 | | | 89.76 |
| 5 | −272.660 | 3.80 | 1.73800 | 32.3 | 89.31 |
| 6 | 128.018 | 0.50 | | | 84.42 |
| 7 | 82.578 | 13.73 | 1.43387 | 95.1 | 84.07 |
| 8 | 648.537 | 62.47 | | | 82.66 |
| 9 (stop) | ∞ | 1.50 | | | 51.15 |
| 10 | 74.152 | 9.64 | 1.80809 | 22.8 | 48.30 |
| 11 | −92.697 | 1.50 | 1.90315 | 29.8 | 46.76 |
| 12 | 56.781 | 48.06 | | | 42.24 |
| 13 | 100.319 | 1.80 | 1.80809 | 22.8 | 29.08 |

-continued unit mm

| | | | | | |
|---|---|---|---|---|---|
| 14 | 56.270 | 4.40 | 1.90366 | 31.3 | 28.33 |
| 15 | 157.977 | 5.05 | | | 27.36 |
| 16 | 69.858 | 4.69 | 1.85478 | 24.8 | 25.00 |
| 17 | −79.548 | 1.62 | 1.76385 | 48.5 | 23.95 |
| 18 | 39.816 | 2.99 | | | 23.03 |
| 19 | −78.851 | 1.57 | 1.91082 | 35.3 | 23.10 |
| 20 | 119.107 | 3.02 | | | 23.76 |
| 21 | 122.941 | 4.72 | 1.51633 | 64.1 | 25.73 |
| 22 | −49.179 | 2.56 | | | 26.47 |
| 23 | −43.755 | 1.70 | 1.76385 | 48.5 | 26.94 |
| 24 | −95.999 | 22.67 | | | 28.05 |
| 25 | 218.669 | 8.46 | 1.73800 | 32.3 | 39.79 |
| 26 | −43.667 | 1.90 | 1.92286 | 18.9 | 40.29 |
| 27 | −79.787 | 85.94 | | | 41.38 |

| | |
|---|---|
| image plane | ∞ |
| focal length | 584.98 |
| F-number | 4.12 |
| half angle of view | 2.12 |
| image height | 21.64 |
| total lens length | 476.10 |
| BF | 85.94 |
| entrance pupil position | 618.32 |
| exit pupil position | −265.10 |
| front principal point position | 228.49 |
| rear principal point position | −499.04 | single lens data

| lens | starting surface | focal length |
|---|---|---|
| 1 | 1 | 476.33 |
| 2 | 3 | 182.55 |
| 3 | 5 | −117.57 |
| 4 | 7 | 216.51 |
| 5 | 10 | 52.33 |
| 6 | 11 | −38.80 |
| 7 | 13 | −161.53 |
| 8 | 14 | 94.77 |
| 9 | 16 | 44.15 |
| 10 | 17 | −34.54 |
| 11 | 19 | −51.89 |
| 12 | 21 | 68.67 |
| 13 | 23 | −106.76 |
| 14 | 25 | 50.01 |
| 15 | 26 | −107.23 |

Numerical Embodiment 7 unit mm surface data

| surface number | r | d | nd | vd | effective diameter |
|---|---|---|---|---|---|
| 1 | 303.613 | 11.69 | 1.54814 | 45.8 | 118.70 |
| 2 | −720.087 | 95.00 | | | 118.22 |
| 3 | 145.704 | 14.21 | 1.43387 | 95.1 | 85.77 |
| 4 | −228.748 | 0.30 | | | 84.22 |
| 5 | −214.415 | 3.50 | 1.74950 | 35.3 | 84.19 |
| 6 | 190.939 | 2.00 | | | 81.27 |
| 7 | 78.997 | 14.38 | 1.43387 | 95.1 | 80.42 |
| 8 | 1108.619 | 1.00 | | | 78.73 |
| 9 | 54.119 | 3.50 | 1.73800 | 32.3 | 71.00 |
| 10 | 47.476 | 66.65 | | | 66.93 |
| 11 | 87.668 | 4.79 | 1.80809 | 22.8 | 42.48 |
| 12 | 171.534 | 2.00 | 1.91082 | 35.3 | 40.89 |
| 13 | 66.228 | 7.96 | | | 39.19 |
| 14 (stop) | ∞ | 24.52 | | | 37.65 |
| 15 | 76.142 | 1.85 | 1.90366 | 31.3 | 29.64 |
| 16 | 75.600 | 3.27 | 1.53775 | 74.7 | 29.01 |
| 17 | 778.003 | 2.00 | | | 28.33 |
| 18 | 123.763 | 3.56 | 1.84666 | 23.8 | 26.99 |
| 19 | −70.153 | 1.61 | 1.77250 | 49.6 | 26.40 |

-continued unit mm

| | | | | | |
|---|---|---|---|---|---|
| 20 | 41.736 | 3.54 | | | 24.48 |
| 21 | −68.635 | 1.50 | 1.91082 | 35.3 | 24.32 |
| 22 | −1082.263 | 4.25 | | | 24.42 |
| 23 | −62.341 | 2.40 | 1.67300 | 38.1 | 24.59 |
| 24 | −48.987 | 31.15 | | | 25.36 |
| 25 | 107.183 | 8.24 | 1.67300 | 38.1 | 39.48 |
| 26 | −54.390 | 1.80 | 1.80809 | 22.8 | 39.71 |
| 27 | −153.673 | 94.42 | | | 40.28 |

| | |
|---|---|
| image plane | ∞ |
| focal length | 489.05 |
| F-number | 4.12 |
| half angle of view | 2.53 |
| image height | 21.64 |
| total lens length | 411.08 |
| BF | 94.42 |
| entrance pupil position | 605.93 |
| exit pupil position | −158.62 |
| front principal point position | 149.81 |
| rear principal point position | −394.63 | single lens data

| lens | starting surface | focal length |
|---|---|---|
| 1 | 1 | 391.20 |
| 2 | 3 | 207.53 |
| 3 | 5 | −134.26 |
| 4 | 7 | 195.22 |
| 5 | 9 | −675.14 |
| 6 | 11 | 216.37 |
| 7 | 12 | −119.52 |
| 8 | 15 | 18912.95 |
| 9 | 16 | 155.46 |
| 10 | 18 | 53.33 |
| 11 | 19 | −33.66 |
| 12 | 21 | −80.51 |
| 13 | 23 | 316.92 |
| 14 | 25 | 54.73 |
| 15 | 26 | −105.03 |

TABLE 2

| | | Embodiment 5 | Embodiment 6 | Embodiment 7 |
|---|---|---|---|---|
| | f | 778.7 | 584.98 | 489.05 |
| | F-number | 5.83 | 4.12 | 4.12 |
| | LD | 486.03 | 476.10 | 411.08 |
| (1) | LD/f | 0.624 | 0.814 | 0.841 |
| | Dpn | 134.28 | 168.13 | 109.51 |
| (3) | Nd1p | 1.593 | 1.532 | 1.548 |
| (4) | vd1p | 35.3 | 48.8 | 45.8 |
| | θgF_G1p | 0.5933 | 0.5631 | 0.5686 |
| | R11 | 168.55 | 302.63 | 303.61 |
| | R12 | 853.59 | −1528.55 | −720.09 |
| | f1p | 351.50 | 476.10 | 391.20 |
| (9) | Ndn | 1.855 | 1.738 | 1.750 |
| (8) | vdn | 24.8 | 32.2 | 35.3 |
| | θgF_Gn | 0.6122 | 0.5899 | 0.5818 |
| | Dpp | 122.18 | 150.00 | 95.00 |
| (13) | vd2p | 95.1 | 95.1 | 95.1 |
| | θgF_G2p | 0.5373 | 0.5373 | 0.5373 |
| | f2p | 218.15 | 182.55 | 207.53 |
| (2) | Dpn/LD | 0.277 | 0.353 | 0.266 |
| (5) | ΔθgF_G1p | 0.0089 | 0.0014 | 0.0018 |
| (6) | (R12 − R11)/(R12 + R11) | 0.670 | — | — |
| (7) | fp/f | 0.451 | 0.814 | 0.800 |
| | ΔθgF_Gn | 0.0101 | 0.0003 | −0.0026 |
| (11) | Dpp/LD | 0.252 | 0.315 | 0.231 |
| (12) | ΔθgF_G2p | 0.0534 | 0.0534 | 0.0534 |
| (14) | f2p/f1p | 0.621 | 0.383 | 0.530 |
| (15) | f2p/f | 0.280 | 0.312 | 0.424 |
| (10) | Σ(vdni/fni)/Σ(1/fni) | 32.17 | 29.25 | 35.04 |

Next, an embodiment of a digital still camera (image pickup apparatus) that employs an optical system of an embodiment as an image pickup apparatus will be described with reference to FIG. 15. In FIG. 15, reference numeral 10 denotes a camera main body, and reference numeral 11 denotes a shooting optical system formed of any one of the optical systems described in Embodiments 1 to 7. Reference numeral 12 denotes a solid-state image pickup element (photoelectric conversion element) such as a CCD sensor or

TABLE 1

| | | Embodiment 1 | Embodiment 2 | Embodiment 3 | Embodiment 4 |
|---|---|---|---|---|---|
| | f | 392.55 | 292.46 | 392.56 | 488.82 |
| | F-number | 2.90 | 2.90 | 2.90 | 4.10 |
| | LD | 372.00 | 273.98 | 371.98 | 411.90 |
| (1) | LD/f | 0.948 | 0.937 | 0.948 | 0.843 |
| | Dpn | 115.06 | 76.63 | 140.19 | 156.95 |
| (3) | Nd1p | 1.593 | 1.593 | 1.593 | 1.593 |
| (4) | vd1p | 35.3 | 35.3 | 35.3 | 35.3 |
| | θgF_G1p | 0.5933 | 0.5933 | 0.5933 | 0.5933 |
| | R11 | 150.64 | 99.46 | 178.78 | 163.34 |
| | R12 | 730.04 | 456.91 | 1415.74 | 943.81 |
| | f1p | 316.96 | 211.24 | 343.67 | 331.15 |
| (9) | Ndn | 1.855 | 1.855 | 1.855 | 1.855 |
| (8) | vdn | 24.8 | 24.8 | 24.8 | 24.8 |
| | θgF_Gn | 0.6122 | 0.6122 | 0.6122 | 0.6122 |
| | Dpp | 100.00 | 64.58 | 124.89 | 144.80 |
| (13) | vd2p | 95.1 | 95.1 | 95.1 | 95.1 |
| | θgF_G2p | 0.5373 | 0.5373 | 0.5373 | 0.5373 |
| | f2p | 188.88 | 127.46 | 162.13 | 129.25 |
| (2) | Dpn/LD | 0.310 | 0.280 | 0.378 | 0.382 |
| (5) | ΔθgF_G1p | 0.0089 | 0.0089 | 0.0089 | 0.0089 |
| (6) | (R12 − R11)/(R12 + R11) | 0.658 | 0.643 | 0.776 | 0.705 |
| (7) | fp/f | 0.807 | 0.722 | 0.875 | 0.677 |
| | ΔθgF_Gn | 0.0101 | 0.0101 | 0.0101 | 0.0101 |
| (11) | Dpp/LD | 0.269 | 0.236 | 0.336 | 0.352 |
| (12) | ΔθgF_G2p | 0.0534 | 0.0534 | 0.0534 | 0.0534 |
| (14) | f2p/f1p | 0.596 | 0.603 | 0.472 | 0.390 |
| (15) | f2p/f | 0.481 | 0.436 | 0.413 | 0.264 |
| (10) | Σ(vdni/fni)/Σ(1/fni) | 29.23 | 26.54 | 28.18 | 36.34 | a CMOS sensor that is built in the camera main body 10 and that receives an object image formed by the shooting optical system 11.

By applying an optical system of an embodiment to an image pickup apparatus such as a digital still camera as described above, an image pickup apparatus that is lightweight and in which aberrations such as spherical aberration and chromatic aberration are satisfactorily corrected can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109658 filed Jun. 1, 2016, which is hereby incorporated by reference herein in its entirety.

What is claimed is:

1. An optical system comprising:
a positive lens G1$p$; and
a negative lens Gn located on a most object side among negative lenses arranged on an image side of the positive lens G1$p$,
wherein the positive lens G1$p$ is a positive lens located on a most object side among positive lenses included in the optical system,
wherein the optical system does not include a diffractive optical element, and
wherein following conditional expressions are satisfied:

$LD/f<1.00$, $0.25<Dpn/LD<0.50$, $1.45<Nd1p<1.62$, $30.0<vd1p<50.0$, $0.17<Dpp/LD<0.50$, and $0.15<f2p/f<0.60$, where Nd1p and vd1p are respectively a refractive index and an Abbe number of a material of the positive lens G1$p$, Dpn is a distance on an optical axis between the positive lens G1$p$ and the negative lens Gn, LD is a distance on the optical axis from a most object side lens surface of the optical system to an image plane, and f is a focal length of the optical system,
where Dpp is a distance on the optical axis between a positive lens G2$p$ located on a most object side among positive lenses arranged on the image side of the positive lens G1$p$ and the positive lens G1$p$, and
where ftp is a focal length of the positive lens G2$p$.

2. The optical system according to claim 1, wherein following conditional expression is satisfied:

$0.000<\theta gF\_G1p-0.6438+0.001682 \times vd1p<0.015$, where $\theta gF\_G1p$ is a partial dispersion ratio of the material of the positive lens G1$p$.

3. The optical system according to claim 1, wherein the positive lens G1$p$ has a meniscus shape convex toward the object side.

4. The optical system according to claim 1, wherein the following conditional expression is satisfied:

$0.30<(R12-R11)/(R12+R11)<1.00$, where R11 is a radius of curvature of an object side lens surface of the positive lens G1$p$, and R12 is a radius of curvature of an image side lens surface of the positive lens G1$p$.

5. The optical system according to claim 1, wherein the following conditional expression is satisfied:

$0.30<f1p/f<1.00$, where f1p is a focal length of the positive lens G1$p$.

6. The optical system according to claim 1, wherein the following conditional expression is satisfied:

$20.0<vdn<45.0$, where vdn is an Abbe number of a material of the negative lens Gn.

7. The optical system according to claim 1, wherein the following conditional expression is satisfied:

$1.65<Ndn<2.20$, where Ndn is a refractive index of a material of the negative lens Gn.

8. The optical system according to claim 1, wherein the optical system has a focusing unit that moves during focusing, and wherein the following conditional expression is satisfied:

$20.00<\Sigma(vdni/fni)/\Sigma(1/fni)<45.00$, where vdni is an Abbe number of a material of an i-th negative lens counted from the object side among negative lenses arranged between the positive lens G1$p$ and the focusing unit, and fni is a focal length of the i-th negative lens.

9. The optical system according to claim 1, wherein the following conditional expressions are satisfied:

$0.020<\theta gF\_G2p-0.6438+0.001682 \times vd2p<0.100$, and $vd2p>73.0$, where vd2p and $\theta gF\_G2p$ are respectively an Abbe number and a partial dispersion ratio of a material of the positive lens G2$p$.

10. The optical system according to claim 1, wherein the following conditional expression is satisfied:

$0.20<f2p/f1p<0.80$, where f1p is a focal length of the positive lens G1$p$, and f2p is a focal length of the positive lens G2$p$.

11. The optical system according to claim 1, wherein the following conditional expression is satisfied:

$0.22<Dpp/LD<0.50$.

12. The optical system according to claim 1, wherein the following conditional expression is satisfied:

$1.45<Nd1p \leq 1.593$.

13. An image pickup apparatus comprising:
an optical system; and
an image pickup element configured to receive an image formed by the optical system,
wherein the optical system includes a positive lens G1$p$, and a negative lens Gn located on a most object side among negative lenses arranged on an image side of the positive lens G1$p$,
wherein the positive lens G1$p$ is a positive lens located on a most object side among positive lenses included in the optical system,
wherein the optical system does not include a diffractive optical element, and wherein following conditional expressions are satisfied:

$LD/f < 1.00,$ $0.25 < Dpn/LD < 0.50,$ $1.45 < Nd1p < 1.62,$ $30.0 < vd1p < 50.0,$ $0.17 < Dpp/LD < 0.50,$ and $0.15 < f2p/f < 0.60,$ where Nd1p and vd1p are respectively a refractive index and an Abbe number of a material of the positive lens G1p, Dpn is a distance on an optical axis between the positive lens G1p and the negative lens Gn, LD is a distance on the optical axis from a most object side lens surface of the optical system to an image plane, and f is a focal length of the optical system, where Dpp is a distance on the optical axis between a positive lens G2p located on a most object side among positive lenses arranged on the image side of the positive lens G1p and the positive lens G1p, and where ftp is a focal length of the positive lens G2p.

14. The image pickup apparatus according to claim 13, wherein the following conditional expression is satisfied:

$1.45 < Nd1p \leq 1.593.$

* * * * *